United States Patent
Hara

(10) Patent No.: US 9,923,866 B2
(45) Date of Patent: Mar. 20, 2018

(54) COMMUNICATION SYSTEM, TERMINAL APPARATUS AND SERVER

(71) Applicant: YAMAHA CORPORATION, Hamamatsu-shi, Shizuoka-ken (JP)

(72) Inventor: Takahiro Hara, Hamamatsu (JP)

(73) Assignee: YAMAHA CORPORATION, Hamamatsu-Shi (JP)

(*) Notice: Subject to any disclaimer, the term of this patent is extended or adjusted under 35 U.S.C. 154(b) by 15 days.

(21) Appl. No.: 15/104,754

(22) PCT Filed: Oct. 31, 2014

(86) PCT No.: PCT/JP2014/079027
§ 371 (c)(1),
(2) Date: Jun. 15, 2016

(87) PCT Pub. No.: WO2015/093158
PCT Pub. Date: Jun. 25, 2015

(65) Prior Publication Data
US 2016/0301660 A1    Oct. 13, 2016

(30) Foreign Application Priority Data

Dec. 16, 2013 (JP) ................................. 2013-259476
Jan. 28, 2014 (JP) ................................. 2014-013497

(51) Int. Cl.
*H04L 29/12* (2006.01)
*H04L 12/721* (2013.01)
(Continued)

(52) U.S. Cl.
CPC .......... *H04L 61/2567* (2013.01); *H04L 45/00* (2013.01); *H04L 45/72* (2013.01); *H04L 45/745* (2013.01); *H04L 61/2517* (2013.01)

(58) Field of Classification Search
CPC ....... H04L 45/00; H04L 45/72; H04L 45/745; H04L 61/2517; H04L 61/2567
See application file for complete search history.

(56) References Cited

U.S. PATENT DOCUMENTS

2009/0323632 A1*  12/2009  Nix ....................... H04L 29/125
                                                                370/331
2012/0236854 A1*   9/2012  Takagishi .......... H04L 29/12377
                                                                370/389

FOREIGN PATENT DOCUMENTS

JP    2004180003 A    6/2004
JP    2005117587 A    4/2005
(Continued)

OTHER PUBLICATIONS

Audet et al. "Network Address Translation (NAT) Behavioral Requirements for Unicast UDP." The Internet Engineering Task Force (IETF). Request for Comments: 4787. Network Working Group. Jan. 2007: 1-27. Web. Jun. 14, 2016.

(Continued)

*Primary Examiner* — Gbemileke J Onamuti
(74) *Attorney, Agent, or Firm* — Rossi, Kimms & McDowell LLP

(57) ABSTRACT

A communication system allows terminals PC1 and PC2 located behind NAT routers to communicate with each other by using source address, source port number, destination address and destination port number. The terminals PC1 and PC2 send data to a server in order to notify respective partner terminals PC2 and PC1 of their respective source port numbers. The server notifies the terminals PC2 and PC1 of port numbers based on the source port numbers used for the data transmission by the terminals PC1 and PC2. The terminals PC1 and PC2 attempt to connect to the terminals PC2 and PC1, respectively, by sending data by using source port numbers different from the source port numbers used (Continued)

for the data transmission to the server SV, and destination port numbers based on the received port numbers related to the terminals PC2 and PC1.

8 Claims, 15 Drawing Sheets

(51) Int. Cl.
*H04L 12/741* (2013.01)
*H04L 12/701* (2013.01)

(56) References Cited

FOREIGN PATENT DOCUMENTS

| | | |
|---|---|---|
| JP | 2007181122 A | 7/2007 |
| WO | 2010094047 A1 | 8/2010 |

OTHER PUBLICATIONS

International Search Report issued in Intl. Appln. No. PCT/JP2014/079027 dated Feb. 3, 2015. English translation provided.
Written Opinion issued in Intl. Appln. No. PCT/JP2014/079027 dated Feb. 3, 2015.
International Preliminary Report on Patentability issued in Intl. Appln. No. PCT/JP2014/079027 dated Oct. 28, 2015.
Office Action issued in Japanese Appln. No. 2014-013497 dated Jan. 17, 2018. English translation provided.
Search Opinion issued in European Appln. No. 14872201.0 dated Jan. 5, 2018.

\* cited by examiner

COMMUNICATION SYSTEM, TERMINAL APPARATUS AND SERVER

TECHNICAL FIELD

The present invention relates to a communication system, a terminal apparatus and a server that enable direct communication between terminal apparatuses located behind NAT routers, respectively, connected with a wide-area communication network such as the Internet.

BACKGROUND ART

Conventionally, there is a known network session system that enables musical sessions such as musical performance (ensemble) played with musical instruments and chorus such as duet via a wide-area communication network such as the Internet. This session system is designed such that each terminal transmits musical performance information generated in accordance with musical performance played on the each terminal to a partner terminal via the wide-area communication network so that the respective terminals can generate musical sounds played by both the terminals. However, the conventional session system is disadvantageous in that in a case where the terminals are located behind their NAT (network address translation) routers, respectively (on the local side), it is necessary for the terminals to traverse the NAT routers in order to directly exchange musical performance information between the terminals without a server.

The NAT technology is described in later-described Non Patent Literature 1, "RFC 4787". The RFC 4787 is technical specifications disclosed by IETF (Internet Engineering Task Force) to describe NAT properties related to NAT router traversal on unicast UDP. As behaviors of NAT routers, three patterns of Endpoint-Independent Mapping, Address-Dependent Mapping, and Address and Port Number-Dependent Mapping are commonly well known. Hereafter, these three behavior patterns of NAT routers will be described. FIGS. 1A to 1C illustrate behavior patterns of NAT routers. In a case where a source terminal such as a PC (personal computer) located behind the NAT router transmit packets by use of the same combination "source address: 192.168.0.1", and "source port number: 5000", the source address and source port number are to be translated by the NAT routers of the three different patterns as indicated in FIGS. 1A to 1C.

CITATION LIST

Non Patent Literature

NPL 1 http://www.ietf.org/rfc/rfc4787.txt

"Pattern 1" of FIG. 1A indicates the behavior of a NAT router of a type in which when packets are sent behind the NAT router by using an identical source address and an identical source port number, the source port number is to be translated into an identical port number regardless of destination address and destination port number. This translation pattern is defined as "Endpoint-Independent Mapping" by RFC 4787. In the pattern 1, an example shown in the left side of the figure indicates that a terminal PC 1 sends a packet 1 to a server SV. The packet 1 is sent to "destination address: 2.2.2.2" and "destination port number: 5000" by using "source address: 192.168.0.1" and "source port number 5000". An example shown in the center of the figure indicates that the terminal PC 1 sends a packet 2 to the server SV. The packet 2 is sent to "destination address: 2.2.2.2" and "destination port number: 5001" by using "source address: 192.168.0.1" and "source port number 5000". An example shown in the right side of the figure indicates that the terminal PC 1 sends a packet 3 to a different terminal PC 2. The packet 3 is sent to "destination address: 3.3.3.3" and "destination port number: 5000" by using "source address: 192.168.0.1" and "source port number 5000". Because these packets use the identical source address and source port number in spite of the packets' destination addresses and destination port numbers which are different with one another, the NAT router behind which the terminal PC 1 is located translates the source port number of these packets into a different identical source port number which is different from the original source port number. For transmission of all these packets 1 to 3, more specifically, the NAT router translates "source address: 192.168.0.1" and "source port number: 5000" into "source address: 1.1.1.1" and "source port number: 20000", for example. "Source address: 192.168.0.1" and "source port number: 5000" is a local address, while "source address: 1.1.1.1" and "source port number: 20000", "destination address: 2.2.2.2" and "destination port number: 5000", "destination address: 2.2.2.2" and "destination port number: 5001", and "destination address: 3.3.3.3" and "destination port number: 5000" are global addresses. The concept of local address and global address will be similarly applied to later-described examples.

"Pattern 2" of FIG. 1B indicates the behavior of a NAT router of a type in which when packets are sent behind the NAT router by using an identical source address and an identical source port number, the source port number is to be translated into a different port number for the packet having a different destination address. This translation pattern is defined as "Address-Dependent Mapping" by RFC 4787. In this pattern, source port numbers are translated sequentially (more specifically, "+1" is added to a previous translation result). In the pattern 2, an example shown in the left side of the figure indicates that the terminal PC 1 sends the packet 1 to the server SV. The packet 1 is sent to "destination address: 2.2.2.2" and "destination port number: 5000" by using "source address: 192.168.0.1" and "source port number 5000". An example shown in the center of the figure indicates that the terminal PC 1 sends the packet 2 to the server SV. The packet 2 is sent to "destination address: 2.2.2.2" and "destination port number: 5001" by using "source address: 192.168.0.1" and "source port number 5000". An example shown in the right side of the figure indicates that the terminal PC 1 sends the packet 3 to the different terminal PC 2. The packet 3 is sent to "destination address: 3.3.3.3" and "destination port number: 5000" by using "source address: 192.168.0.1" and "source port number 5000". In this pattern, if the packets have destination addresses which are different with each other, the NAT router behind which the terminal PC 1 is located translates the source port number of the packets such that, in spite of the identical source address and the identical source port number of these packets, the packets having different destination addresses are assigned different source port numbers, respectively. For transmission of the packets 1 and 2, for instance, the NAT router translates "source address: 192.168.0.1" and "source port number: 5000" into "source address: 1.1.1.1" and "source port number: 20000". For transmission of the packet 3, however, the NAT router translates "source address: 192.168.0.1" and "source port number: 5000" into "source address: 1.1.1.1" and "source port number: 20001".

"Pattern 3" of FIG. 1C indicates the behavior of a NAT router of a type in which when packets are sent behind the NAT router by using an identical source address and an identical source port number, the source port number is to be translated into a different port number even for the packet having either a different destination address or a different destination port number. This pattern is defined as "Address and Port Number-Dependent Mapping" by RFC 4787. In this pattern as well, source port numbers are translated sequentially (more specifically, "+1" is added to a previous translation result). In the pattern 3, an example shown in the left side of the figure indicates that the terminal PC 1 sends the packet 1 to the server SV. The packet 1 is sent to "destination address: 2.2.2.2" and "destination port number: 5000" by using "source address: 192.168.0.1" and "source port number 5000". An example shown in the center of the figure indicates that the terminal PC 1 sends the packet 2 to the server SV. The packet 2 is sent to "destination address: 2.2.2.2" and "destination port number: 5001" by using "source address: 192.168.0.1" and "source port number 5000". An example shown in the right side of the figure indicates that the terminal PC 1 sends the packet 3 to the different terminal PC 2. The packet 3 is sent to "destination address: 3.3.3.3" and "destination port number: 5000" by using "source address: 192.168.0.1" and "source port number 5000". In this pattern, if either the destination address or the destination port number of a packet which is to be sent is different from that of the other packets, the NAT router behind which the terminal PC 1 is located translates the source port number such that, in spite of the identical source address and the identical source port number of these packets, the packets having either different destination addresses or different destination port numbers are assigned different source port numbers, respectively. For transmission of the packet 1, for instance, the NAT router translates "source address: 192.168.0.1" and "source port number: 5000" into "source address: 1.1.1.1" and "source port number: 20000". For transmission of the packet 2, the NAT router translates "source address: 192.168.0.1" and "source port number: 5000" into "source address: 1.1.1.1" and "source port number: 20001". For transmission of the packet 3, furthermore, the NAT router translates "source address: 192.168.0.1" and "source port number: 5000" into "source address: 1.1.1.1" and "source port number: 20002".

Due to the influence caused by the above-described translation of source addresses and source port numbers by the NAT routers, direct communication between the two terminals located behind the NAT routers cannot be successfully established without knowing translated addresses and port numbers by any scheme.

For example, assume that a terminal PC 1 located behind a NAT router NR1 and a terminal PC 2 located behind a NAT router NR2 which know their respective partner's external (global) "IP addresses: 3.3.3.3; 1.1.1.1" are attempting to communicate with each other with "port number:5000". As indicated in FIG. 2, more specifically, using the identical "source address: 192.168.0.1" and "source port number: 5000", the terminal PC 1 transmits a packet to "destination address: 3.3.3.3" and "destination port number: 5000", while the terminal PC 2 transmits a packet to "destination address: 1.1.1.1" and "destination port number: 5000" in an attempt to communicate with each other. However, their respective "source port numbers: 20000, 30000" translated by the NAT routers NR1 and NR2 do not agree with "destination port number: 5000" of the NAT routers NR2 and NR1, failing to traverse the NAT routers NR2 and NR1.

In such a case, communication is possible in the pattern 1 and the pattern 2 by using a technique generally known as "UDP hole punching". For example, assume that with a server which is not located behind any NAT router being provided, the terminals PC 1 and PC 2 communicate with the server through the NAT router 1 and the NAT router 2, respectively. In this example, the server can know the terminals' addresses and port numbers translated by the NAT routers NR1 and NR2. Then, the server notifies the terminal PC 1 that the address and translated port number of the terminal PC 2 are 3.3.3.3 and 30000. The server also notifies the terminal PC 2 that the address and translated port number of the terminal PC 1 are 1.1.1.1 and 20000. In a case where the NAT routers NR1 and NR2 are routers of the pattern 1, the terminals PC 1 and PC 2 transmit packets destined for the terminal PC 1's address and port number, and the terminal PC 2's address and port number notified by the server, respectively, so that the packets can traverse the NAT routers NR2 and NR1. In FIG. 2, although the terminals PC 1 and PC 2 have the same address "192.168.0.1" which is a local address, the terminals PC 1 and PC 2 may have either the same local address or different local addresses, which can be applied to the other figures as well.

In a case where the NAT routers NR1 and NR2 are NAT routers of pattern 2, packets cannot traverse the NAT routers even if port numbers notified by the server are used. In many cases, however, source port numbers are translated by the NAT routers to change in a sequential manner such as "30000"→"30001". Therefore, packets can traverse the NAT routers by trying using previous or following port numbers in the sequential manner such as port number scanning. In the above-described example, if the terminal PC1 uses destination port number "30000" to fail to traverse the NAT router, the terminal PC1 tries using "30001" to successfully traverse the NAT router. If the terminal PC2 uses destination port number "20000" to fail to traverse the NAT router, the terminal PC2 tries using "20001" to successfully traverse the NAT router. As for the NAT routers of the pattern 2, in other words, for transmission of packets to an identical destination address, the source port number of the packets will not change despite different destination port numbers as described below. Therefore, a combination of port numbers that can traverse the NAT routers can be successfully found out by trying using previous or following port numbers as destination port number.

| NAT-translated source port number | | destination port number |
|---|---|---|
| (PC 1 side) | | |
| 20001 | → | 30000 |
| 20001 | → | 30001 ⊙ |
| 20001 | → | 30002 |
| ... | | ... |
| (PC 2 side) | | |
| 30001 | → | 20000 |
| 30001 | → | 20001 ⊙ |
| 30001 | → | 20002 |
| ... | | ... |

By using the UDP hole punching technique, as described above, communication by using the NAT routers of the pattern 1 as shown in FIG. 1A and the pattern 2 as shown in FIG. 1B is possible. In a case, however, where both the NAT routers NR1 and NR2 are the NAT routers of the pattern 3 as shown in FIG. 1C, in other words, in a case of the NAT router of the type which performs translation such that, for transmission of packets destined for an identical destination address but different destination port numbers from an identical source address and an identical source port number, the source port number is translated into different port numbers, communication between the terminals cannot be established by the technique employed in the above-described communications by the pattern 1 and pattern 2. Even if previous or following port numbers are tried sequentially as destination port number as in the case of the pattern 2, the NAT router also changes translated source port number at every try. As a result, there will be no match that allows traverse as shown below. If either of the NAT router 1 or 2 is the pattern 1 or 2, communication can be established by using the UDP hole punching technique, for the source port number translated by the NAT router of the pattern 1 or 2 will not be changed.

| NAT-translated source port number | | destination port number |
|---|---|---|
| (PC 1 side) | | |
| 20001 | → | 30000 |
| 20002 | → | 30001 |
| 20003 | → | 30002 |
| 20004 | → | 30003 |
| ... | | ... |
| (PC 2 side) | | |
| 30001 | → | 20000 |
| 30002 | → | 20001 |
| 30003 | → | 20002 |
| 30004 | → | 20003 |
| ... | | ... |

SUMMARY OF INVENTION

The present invention was accomplished to solve the above-described problem, and an object thereof is to provide a communication system, a terminal apparatus, a server and the like which allow direct communication by using source address, source port number, destination address and destination port number between two terminals which are located behind separate NAT routers, respectively, even if the NAT routers are a type of NAT router which performs translation such that packets having different destination port numbers are assigned different source port numbers. As for the following descriptions about respective constituent features of the present invention, furthermore, reference letters of corresponding components of embodiments described later are provided in parentheses to facilitate the understanding of the present invention. However, it should not be understood that the constituent features of the present invention are limited to the corresponding components indicated by the reference letters of the embodiments.

It is a first aspect of the invention to provide a communication system including a first terminal (TMa, PC1) located behind a first NAT router (NRa, NR1), a second terminal (TMb, PC2) located behind a second NAT router (NRb, NR2) and a server (SV) which is not located behind any NAT routers, the first terminal and the second terminal communicating with each other through the first NAT router and the second NAT router by using source address, source port number, destination address and destination port number, the server notifying the second terminal of a first port number based on a first source port number used for transmission of first data by the first terminal, and notifying the first terminal of a second port number based on a second source port number used for transmission of second data by the second terminal (S5), the first terminal including first transmitting means (C3) for transmitting the first data to the server by using the first source port number, first receiving means (C4) for receiving the second port number related to the second terminal from the server, and first attempting means (C5, C6) for attempting to connect to the second terminal by transmitting third data by using a third source port number different from the first source port number and a first destination port number based on the second port number, and the second terminal including second transmitting means (C3) for transmitting the second data to the server by using the second source port number, second receiving means (C4) for receiving the first port number related to the first terminal from the server, and second attempting means (C5, C6) for attempting to connect to the first terminal by transmitting fourth data by using a fourth source port number different from the second source port number and a second destination port number based on the first port number.

Furthermore, it is also the first aspect of the invention to provide a terminal apparatus serving as a first terminal (TMa, PC1) in a communication system including the first terminal located behind a first NAT router (NRa, NR1), a second terminal (TMb, PC2) located behind a second NAT router (NRb, NR2), and a server (SV) which is not located behind any NAT routers to allow the first terminal and the second terminal to communicate with each other through the first NAT router and the second NAT router by using source address, source port number, destination address and destination port number, the terminal apparatus including transmitting means (C3) for transmitting first data to the server by using a first source port number, receiving means (C4) for receiving a port number related to the second terminal from the server, and attempting means (C5, C6) for attempting to connect to the second terminal by transmitting second data by using a second source port number different from the first source port number and a destination port number based on the port number.

In the first aspect configured as above, prior to direct communication between the first and second terminals, the first and second transmitting means of the first and second terminals transmit the first and second data to the server by using the first and second source port numbers, respectively. The server notifies the second and first terminals of the first and second port numbers based on the first and second source port numbers, respectively. In the first and second terminals, the first and second receiving means receive the second and first port numbers related to the second and first terminals from the server, respectively, while the first and second attempting means attempt to connect to the second and first terminals by transmitting the third and fourth data by using the third and fourth source port numbers different from the first and second source port numbers, and the first and second destination port numbers based on the second and first port numbers, respectively. In this case, the first and second NAT routers have a property of translating source port number to change in accordance with a certain rule at every change in source port number. Therefore, the first and second terminals are able to communicate with each other irrespective of the type of the first and second NAT routers behind which the first and second terminals are located. Regardless of the type of the first and second NAT routers behind which the first and second terminals are located, as a result, the first aspect of the invention allows the first and second terminals to communicate directly with each other only by changing source port numbers used for transmission to the server without the need for judging the type of the first and second NAT routers.

It is a second aspect of the invention to provide a communication system including a first terminal (TMa, PC1) located behind a first NAT router (NRa, NR1), a second terminal (TMb, PC2) located behind a second NAT router (NRb, NR2) and a server (SV) which is not located behind any NAT routers, the first terminal and the second terminal communicating with each other through the first NAT router and the second NAT router, the first terminal including first transmitting means (C3) for transmitting first data to the server through the first NAT router by using a first source port number, the second terminal including second transmitting means (C3) for transmitting second data to the server through the second NAT router by using a second source port number, the server including data receiving means (S4) for receiving the first data and the second data transmitted to the server by the first transmitting means and the second transmitting means, respectively, and guessing means (S5) for guessing a first guessed port number related to the first terminal based on the first source port number used for transmission of the first data received by the data receiving means and notifying the second terminal through the second NAT router of the first guessed port number, and guessing a second guessed port number related to the second terminal based on the second source port number used for transmission of the second data received by the data receiving means and notifying the first terminal through the first NAT router of the second guessed port number, the first terminal further including first receiving means (C4) for receiving the second guessed port number notified by the guessing means, and first attempting means (C20) for attempting to connect to the second terminal by transmitting third data to the second terminal through the first NAT router and the second NAT router by using the first source port number and a first destination port number based on the second guessed port number, and the second terminal further including second receiving means (C4) for receiving the first guessed port number notified by the guessing means, and second attempting means (C20) for attempting to connect to the first terminal by transmitting fourth data to the first terminal through the second NAT router and the first NAT router by using the second source port number and a second destination port number based on the first guessed port number.

Furthermore, it is also the second aspect to provide a server used in a communication system including a first terminal (TMa, PC1) located behind a first NAT router (NRa, NR1), a second terminal (TMb, PC2) located behind a second NAT router (NRb, NR2), and the server (SV) which is not located behind any NAT routers to allow the first terminal and the second terminal to communicate with each other through the first NAT router and the second NAT router, the server including data receiving means (S4) for receiving first data transmitted by using a first source port number to the server through the first NAT router from the first terminal, and receiving second data transmitted by using a second source port number to the server through the second NAT router from the second terminal, and guessing means (S5) for guessing a first guessed port number related to the first terminal based on the first source port number used for transmission of the received first data and notifying the second terminal through the second NAT router of the first guessed port number, and guessing a second guessed port number related to the second terminal based on the second source port number used for transmission of the received second data and notifying the first terminal through the first NAT router of the second guessed port number.

In the second aspect configured as above, the guessing means of the server guesses the first and second guessed port numbers related to the first and second terminals based on the first and second source port numbers used for transmission of the first and second data from the first and second terminals, respectively, and notifies the second and first terminals through the second and first NAT routers of the guessed first and second guessed port numbers, respectively. Then, the first attempting means of the first terminal attempts to connect to the second terminal by transmitting the third data to the second terminal through the first and second NAT routers by using the first source port number, and the first destination port number based on the second guessed port number. The second attempting means attempts to connect to the first terminal by transmitting the fourth data to the first terminal through the second and first NAT routers by using the second source port number, and the second destination port number based on the first guessed port number.

In a case where the first and second NAT routers are the above-described pattern 2, source port number will be changed for packets having an identical source address and an identical source port number but different destination addresses. In a case where the first and second NAT routers are the above-described pattern 3, source port number will be changed for packets having an identical source address and an identical source port number but either different destination addresses or different destination port numbers. In the second aspect of the invention, the first and second attempting means of the first and second terminals attempt to connect to the second and first terminals by transmitting the third and fourth data to the second and first terminals by using the first and second destination port numbers based on the second and first guessed port numbers, respectively. Therefore, on condition that the first and second NAT routers are routers of the above-described pattern 2 or pattern 3, connection that enables communication between the first and second terminals through the first and second NAT routers can be established by deriving, from the first and second guessed port numbers, destination port numbers corresponding to the source port numbers translated by the first and second NAT routers on the basis of the first and second source port numbers used for transmission of the first and second data to the server from the first and second transmitting means of the first and second terminals to use the derived destination port numbers as the first and second destination port numbers.

In a case where the first or second NAT router is the above-described pattern 1, however, connection that enables communication between the first and second terminals through the first and second NAT routers cannot be established. In this case, however, as long as the source port number related to the first or second terminal for the attempt is not changed, source port number will not be changed by the first or second NAT router of pattern 1. In this case, therefore, by making a retry to the first or second terminal to which connection could not be established by defining a port number equal to the source port number used for data transmission to the server as a destination port number, connection that enables communication between the first and second terminals through the first and second NAT routers can be established even in the case where the first or second NAT router is a router of pattern 1. Furthermore, using the above-described UDP hole punching technique by which port numbers that precede or follow the first and second terminals' source port numbers which are guessed port numbers notified by the server are sequentially assigned as destination port numbers, connection that enables communication between the first and second terminals through the first and second NAT routers can be also established. As a result, regardless of the type of the first and second NAT routers behind which the first and second terminals are located, the second aspect of the invention enables communication between the first and second terminals without the need for judging the type of the first and second NAT routers.

The present invention can be embodied not only as the communication system, the terminal apparatus and the server but also as a communicating method applied to a communication system, a communicating method and a computer program applied to a terminal apparatus, and a communicating method and a computer program applied to a server.

Figure 1A:
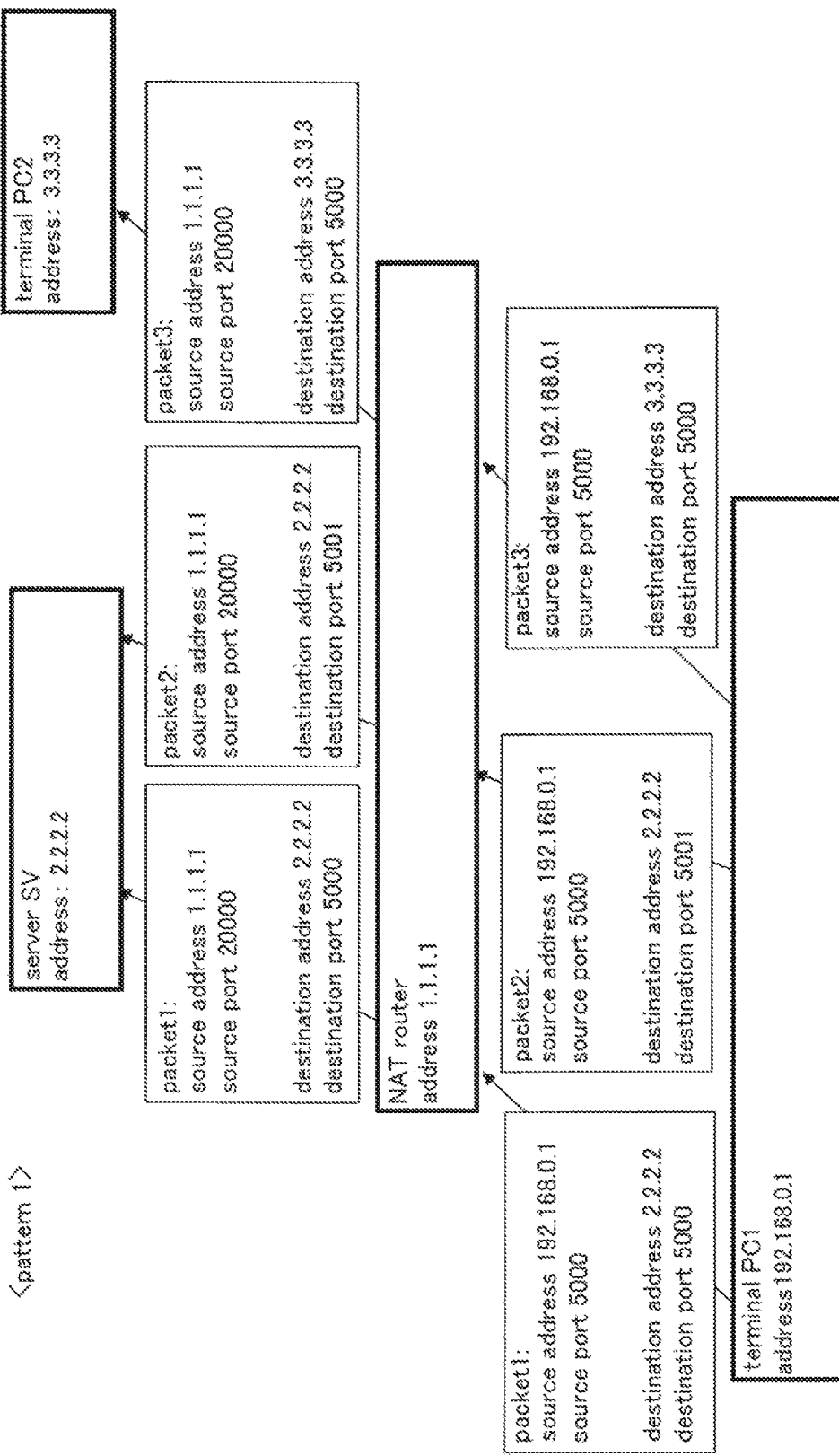
FIG. 1A is a diagram describing an example of endpoint-independent mapping which is pattern 1 of behavior patterns of NAT routers.

DESCRIPTION OF EMBODIMENTS a. Disclosure of the Invention

Prior to concrete descriptions about embodiments, aspects according to the first and second embodiments will be described. It is the aspect of the first embodiment to provide a communication system including a first terminal (TMa, PC1) located behind a first NAT router (NRa, NR1), a second terminal (TMb, PC2) located behind a second NAT router (NRb, NR2) and a server (SV) which is not located behind any NAT routers, the first terminal and the second terminal communicating with each other through the first NAT router and the second NAT router by using source address, source port number, destination address and destination port number, the server notifying the second terminal of a first port number based on a first source port number used for transmission of first data by the first terminal, and notifying the first terminal of a second port number based on a second source port number used for transmission of second data by the second terminal (S5), the first terminal including first transmitting means (C3) for transmitting the first data to the server by using the first source port number, first receiving means (C4) for receiving the second port number related to the second terminal from the server, and first attempting means (C5, C6) for attempting to connect to the second terminal by transmitting third data by using a third source port number different from the first source port number and a first destination port number based on the second port number, and the second terminal including second transmitting means (C3) for transmitting the second data to the server by using the second source port number, second receiving means (C4) for receiving the first port number related to the first terminal from the server, and second attempting means (C5, C6) for attempting to connect to the first terminal by transmitting fourth data by using a fourth source port number different from the second source port number and a second destination port number based on the first port number.

In this case, for example, the server further notifies the second terminal of a first source address used for transmission of the first data, and notifies the first terminal of a second source address used for transmission of the second data, the first receiving means of the first terminal further receives the second source address of the second terminal from the server, the first attempting means of the first terminal attempts to connect to the second terminal by using the second source address in addition to the third source port number and the first destination port number, the second receiving means of the second terminal further receives the first source address of the first terminal from the server, and the second attempting means of the second terminal attempts to connect to the first terminal by using the first source address in addition to the fourth source port number and the second destination port number.

For example, furthermore, the server notifies the second terminal of the first port number obtained by adding a certain value to the first source port number, and notifies the first terminal of the second port number obtained by adding a certain value to the second source port number. Furthermore, the server may notify the second terminal of the first source port number as the first port number, and notify the first terminal of the second source port number as the second port number, the first attempting means of the first terminal may attempt to connect to the second terminal by transmitting the third data by using the third source port number and the first destination port number obtained by adding a certain value to the second source port number received by the first receiving means, and the second attempting means of the second terminal may attempt to connect to the first terminal by transmitting the fourth data by using the fourth source port number and the second destination port number obtained by adding a certain value to the first source port number received by the second receiving means.

In the above configuration, the first attempting means attempts to connect to the second terminal by transmitting the third data by using the third source port number different from the first source port number used for transmission of the first data to the server, and the first destination port number based on the second port number received from the server. The second attempting means attempts to connect to the first terminal by transmitting the fourth data by using the fourth source port number different from the second source port number used for transmission of the second data to the server, and the second destination port number based on the first port number received from the server. In this case, the first and second NAT routers have a property of translating source port number to change in accordance with a certain rule at every change in source port number. Therefore, the first and second terminals are able to communicate with each other irrespective of the type of the first and second NAT routers behind which the first and second terminals are located. According to the above configuration, as a result, regardless of the type of the first and second NAT routers behind which the first and second terminals are located, the first and second terminals are able to communicate directly with each other only by changing source port numbers used for transmission to the server without the need for judging the type of the first and second NAT routers.

Furthermore, it is the aspect of the second embodiment to provide a communication system including a first terminal (TMa, PC1) located behind a first NAT router (NRa, NR1), a second terminal (TMb, PC2) located behind a second NAT router (NRb, NR2) and a server (SV) which is not located behind any NAT routers, the first terminal and the second terminal communicating with each other through the first NAT router and the second NAT router, the first terminal including first transmitting means (C3) for transmitting first data to the server through the first NAT router by using a first source port number, the second terminal including second transmitting means (C3) for transmitting second data to the server through the second NAT router by using a second source port number, the server including data receiving means (S4) for receiving the first data and the second data transmitted to the server by the first transmitting means and the second transmitting means, respectively, and guessing means (S5) for guessing a first guessed port number related to the first terminal based on the first source port number used for transmission of the first data received by the data receiving means and notifying the second terminal through the second NAT router of the first guessed port number, and guessing a second guessed port number related to the second terminal based on the second source port number used for transmission of the second data received by the data receiving means and notifying the first terminal through the first NAT router of the second guessed port number, the first terminal further including first receiving means (C4) for receiving the second guessed port number notified by the guessing means, and first attempting means (C20) for attempting to connect to the second terminal by transmitting third data to the second terminal through the first NAT router and the second NAT router by using the first source port number and a first destination port number based on the second guessed port number, and the second terminal further including second receiving means (C4) for receiving the first guessed port number notified by the guessing means, and second attempting means (C20) for attempting to connect to the first terminal by transmitting fourth data to the first terminal through the second NAT router and the first NAT router by using the second source port number and a second destination port number based on the first guessed port number.

In this case, for example, after attempting to connect to the second terminal by using the first source port number and the first destination port number, the first attempting means may further attempt to connect to the second terminal by transmitting fifth data to the second terminal through the first NAT router and the second NAT router by using the first source port number and a third destination port number which differs by a certain value from the first destination port number, and after attempting to connect to the first terminal by using the second source port number and the second destination port number, the second attempting means may further attempt to connect to the second terminal by transmitting sixth data to the first terminal via the second NAT router and the first NAT router by using the second source port number and a fourth destination port number which differs by a certain value from the second destination port number.

Furthermore, for example, the first guessed port number is a port number that differs by a certain value from the first source port number used for transmission of the first data to the server by the first transmitting means, and the second guessed port number is a port number that differs by a certain value from the second source port number used for transmission of the second data to the server by the second transmitting means. Furthermore, the first destination port number may be a port number identical to the second guessed port number, and the second destination port number may be a port number identical to the first guessed port number.

Furthermore, the first guessed port number may be a port number identical to the first source port number used for transmission of the first data to the server by the first transmitting means, and the second guessed port number may be a port number identical to the second source port number used for transmission of the second data to the server by the second transmitting means. In this case, the first destination port number may be a port number that differs by a certain value from the second guessed port number, and the second destination port number may be a port number that differs by a certain value from the first guessed port number.

In the above configuration, in addition to the attempt to connect to the second terminal by using the first source port number and the first destination port number, the first attempting means makes an attempt to connect to the second terminal by using the first source port number and the third destination port number that differs by the certain value from the first destination port number. In addition to the attempt to connect to the first terminal by using the second source port number and the second destination port number, the second attempting means makes an attempt to connect to the second terminal by using the second source port number and the fourth destination port number that differs by the certain value from the second destination port number. In this case, as described above, as long as the source port number related to the first or second terminal in the attempt is not changed, the first or second NAT router of pattern 1 will not change the source port number. Even in the case where the first or second NAT router is a router of pattern 1, therefore, connection that enables communication between the first and second terminals through the first and second NAT routers can be established. According to the above configuration, as a result, regardless of the type of the first and second NAT routers behind which the first and second terminals are located, the first and second terminals can easily communicate with each other without the need for judging the type of the first and second NAT routers.

In the second aspect, furthermore, the first NAT router and the second NAT router are routers of a type which translates source port number to change by the certain value in accordance with a change in at least either destination address or destination port number, for example. More specifically, the first NAT router and the second NAT router are routers of a type which translates source port number to change by "+1" in accordance with a change in at least either destination address or destination port number, for example. More specifically, the first destination port number is a port number greater by "+1" than the second source port number, and the second destination port number is a port number greater by "+1" than the first source port number.

b. First Embodiment

The first embodiment of the invention will now be described.

[Overview of System Configuration]

Figure 3:
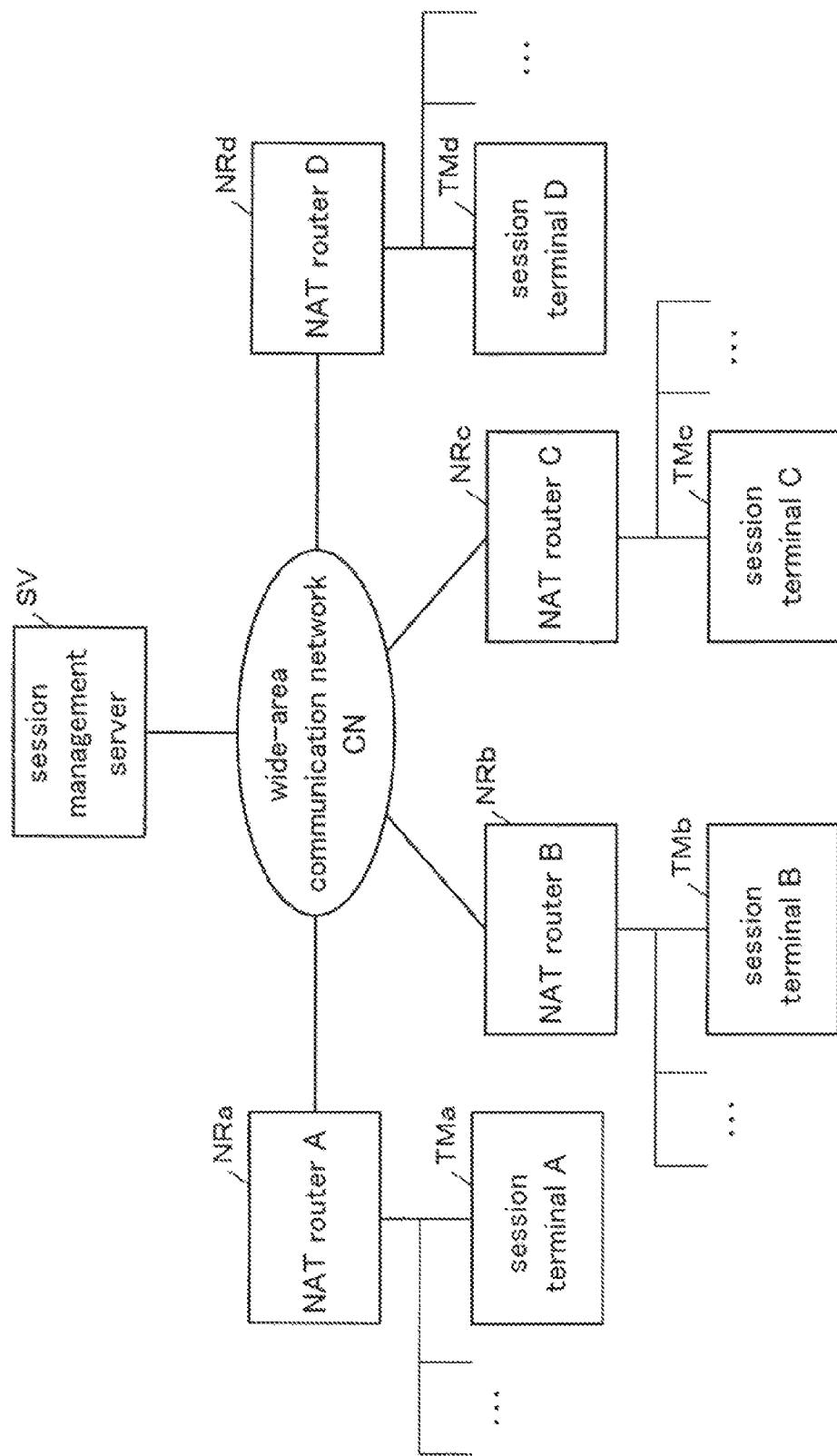
FIG. 3 indicates an example configuration of a network session system according to the first and second embodiments of the present invention.

FIG. 3 indicates a configuration of a network session system according to the first embodiment. The network session system is a communication system formed of a session management server (also simply referred to as a server) SV, a plurality of NAT routers NR: NRa to NRd (letters "NR" represent a NAT router), and session terminals TM: TMa to TMd (letters "TM" represent a session terminal) located behind the NAT routers NR, respectively. The session management server SV, the NAT routers NR: NRa to NRd, and the session terminals TM: TMa to TMd are connected with each other via a wide-area communication network CN such as Internet so that they can communicate with each other.

The session management server SV is not located behind any NAT routers, but assists connections between the member session terminals TM. For instance, the session management server SV makes arrangements for connections between the respective session terminals TM before starting a session. After the establishment of the connections between the session terminals TM such as the session terminals TMa to TMd, musical performance information such as audio data is directly transmitted and received between the session terminals TMa to TMd located behind the NAT routers without the session management server SV.

Not only the session terminals TM shown in the figure but also a plurality of host apparatuses are located behind the NAT routers NR. Furthermore, each of the NAT routers NR has a NAT function of passing on data between a local network formed of the apparatuses and the wide-area communication network CN, and translating addresses and port numbers between the networks. More specifically, the respective NAT routers NR automatically translate local addresses and port numbers which are randomly assigned and available only within the respective local networks into global addresses and port numbers available on the wide-area communication network CN, and vice versa. The NAT function has the three types of known patterns 1 to 3 as described with reference to FIG. 1A to FIG. 1C.

Figure 1B:
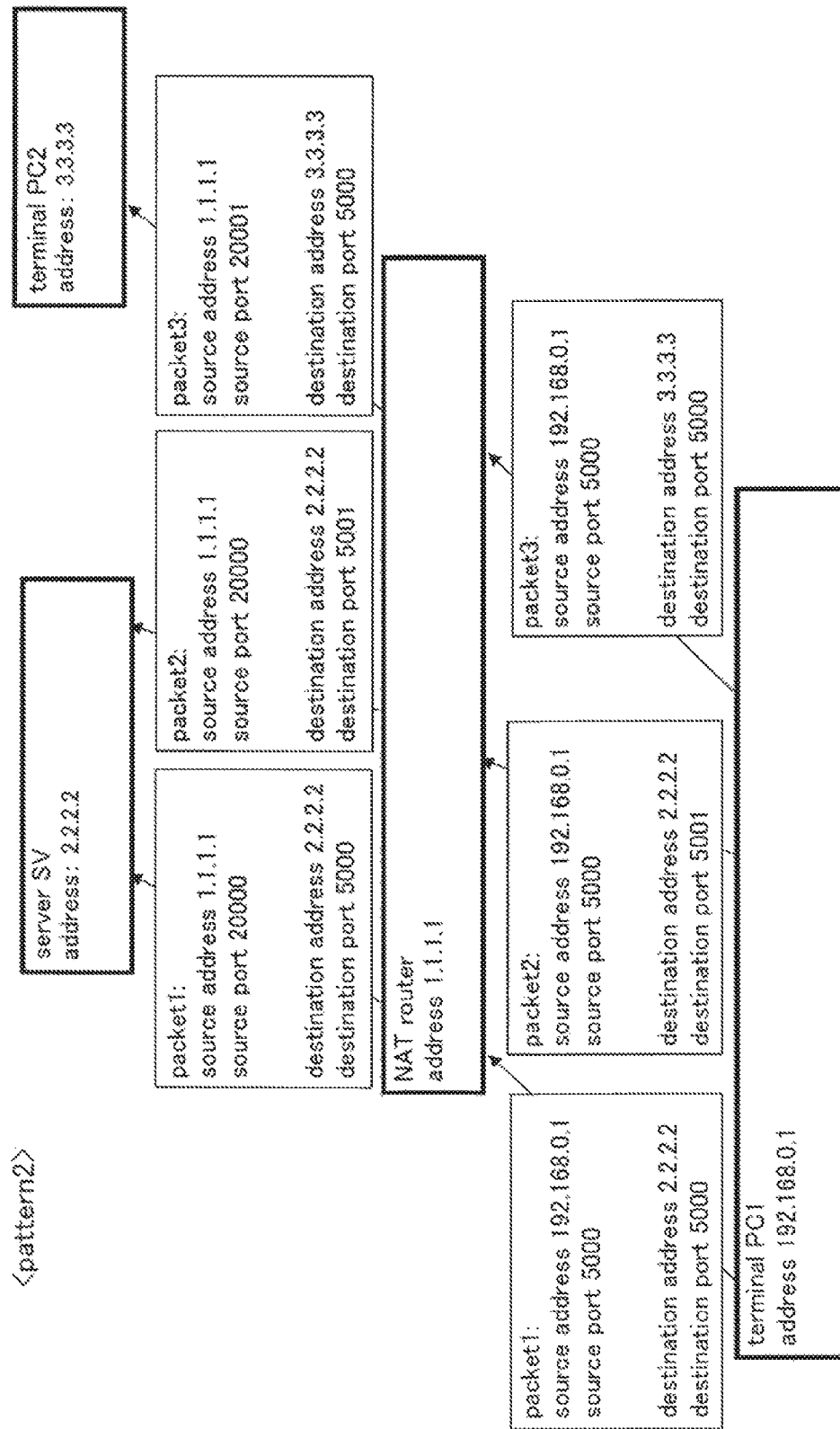
FIG. 1B is a diagram describing an example of address-dependent mapping which is pattern 2 of behavior patterns of NAT routers.
Figure 1C:
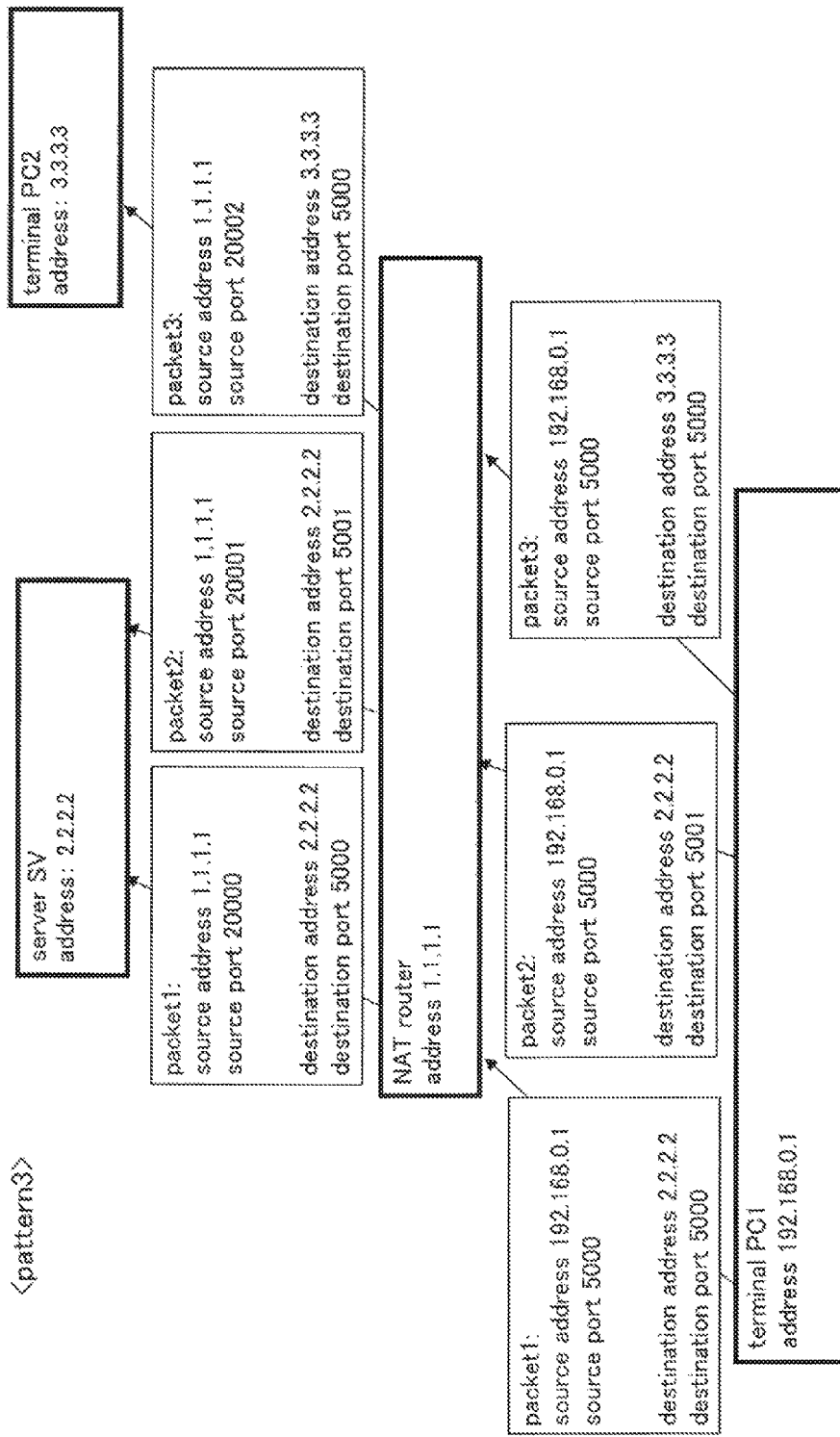
FIG. 1C is a diagram describing an example of address and port number-dependent mapping which is pattern 3 of behavior patterns of NAT routers.

More specifically, the NAT router of pattern 1 has a translation pattern function referred to as Endpoint-Independent Mapping. As indicated in FIG. 1A, for transmission of packets by using an identical source address and an identical source port number through the NAT router, the NAT router of pattern 1 translates the source port number into an identical port number regardless of destination address and destination port number. The NAT router of pattern 2 has a translation pattern function referred to as Address-Dependent Mapping. As indicated in FIG. 1B, for transmission of packets by using an identical source address and an identical source port number through the NAT router, the NAT router of pattern 2 translates the source port number into different port numbers for different destination addresses, respectively. The NAT router of pattern 3 has a translation pattern function referred to as Address and Port Number-Dependent Mapping. As indicated in FIG. 1C, for transmission of packets by using an identical source address and an identical source port number through the NAT router, the NAT router of pattern 3 translates the source port number into different port numbers even for packets having either different destination addresses or different destination port numbers.

The session terminals TMa to TMd which serve as network music session members are referred to as client terminals or simply referred to as clients, and are electronic musical apparatuses which are capable of playing musical instruments and/or karaoke. In other words, each of the session terminals TM is a kind of computer having a capability of processing electronic music information, and can be an electronic musical instrument or an electronic musical apparatus such as a personal computer (PC) on which a musical information processing application has been installed. More specifically, there are cases where a session terminal TM performs both musical performance by musical instruments and karaoke, while there are also cases where an electronic musical instrument is used as a session terminal TM without karaoke. Furthermore, there are cases where a PC having the musical information processing application is used as a session terminal TM to perform only karaoke. Although FIG. 3 indicates four session terminals TM (session members) as an example, the number of session terminals TM is not limited to four, and may be either greater or smaller than four.

[Procedures for Retrieval of Translated Address and Port Number]

Figure 2:
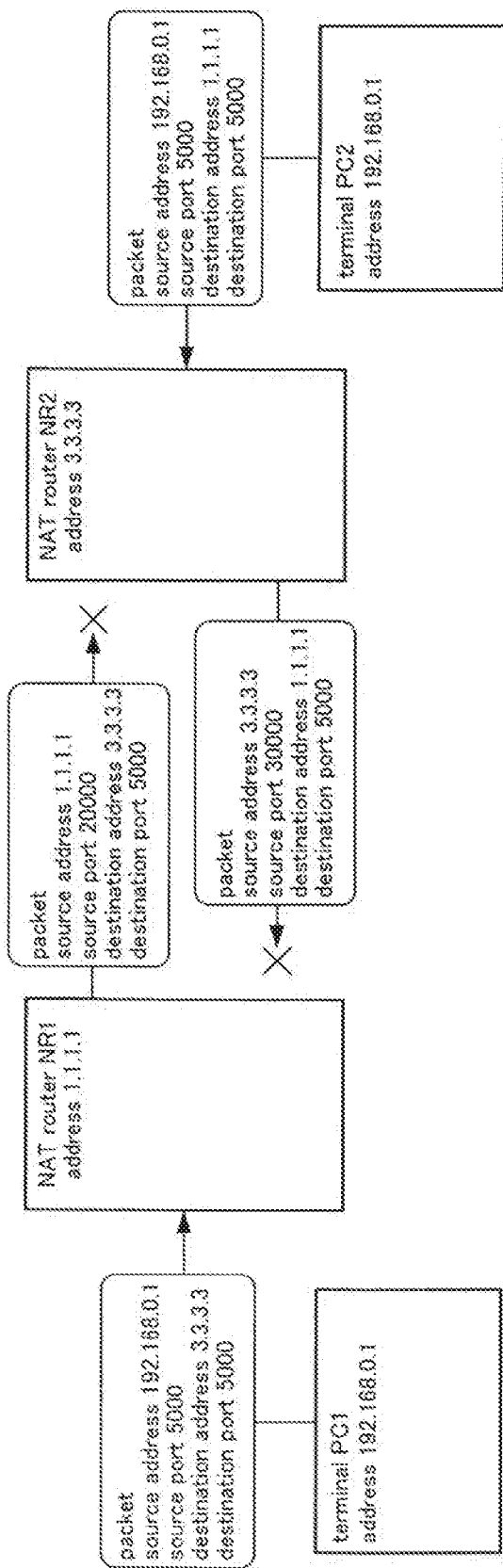
FIG. 2 is a diagram describing problems in communication between two terminals located behind NAT routers.
Figure 4A:
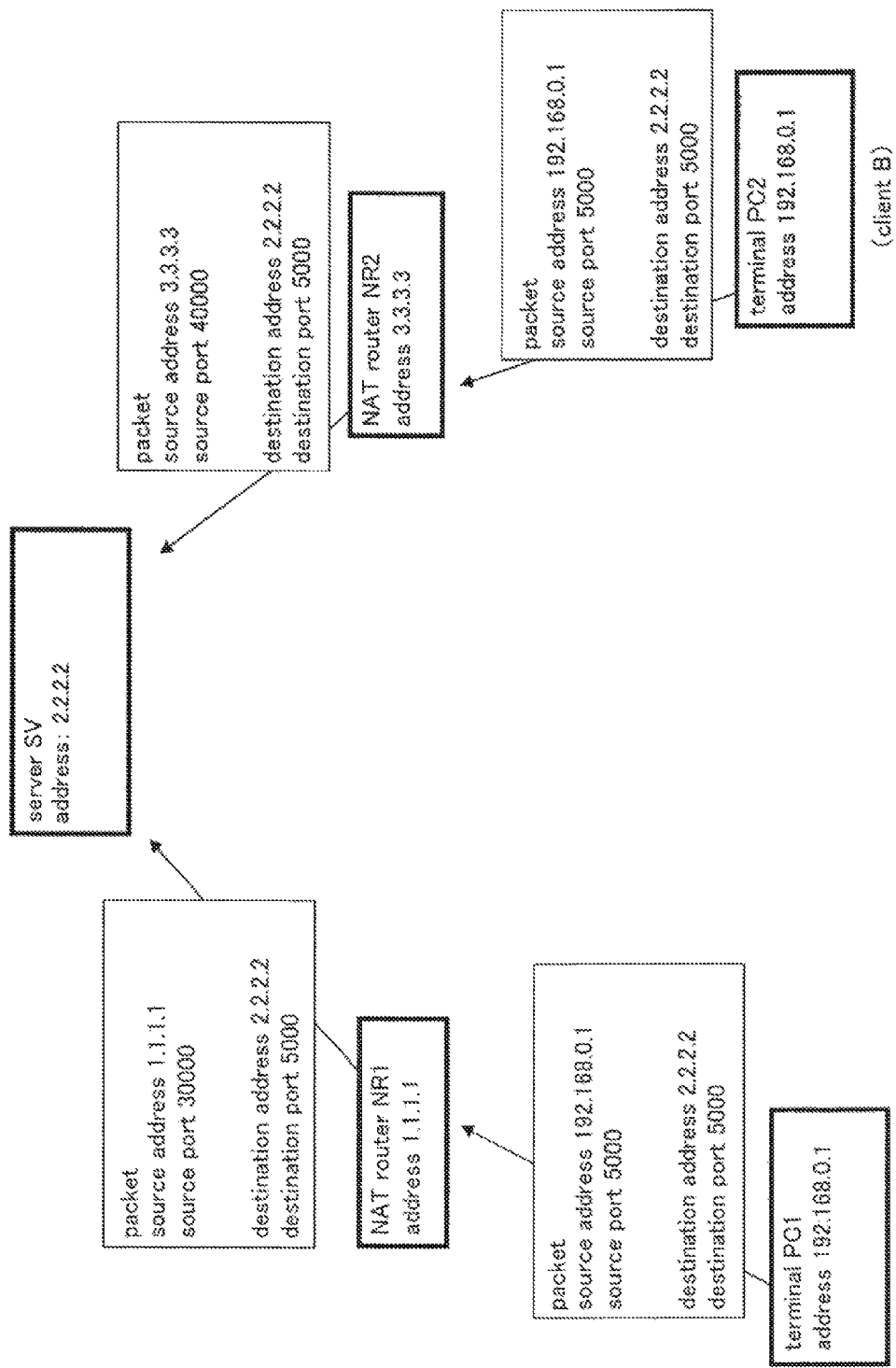
FIG. 4A indicates communication from terminals PC1 and PC2 (clients A and B) to a server according to the first embodiment.
Figure 4B:
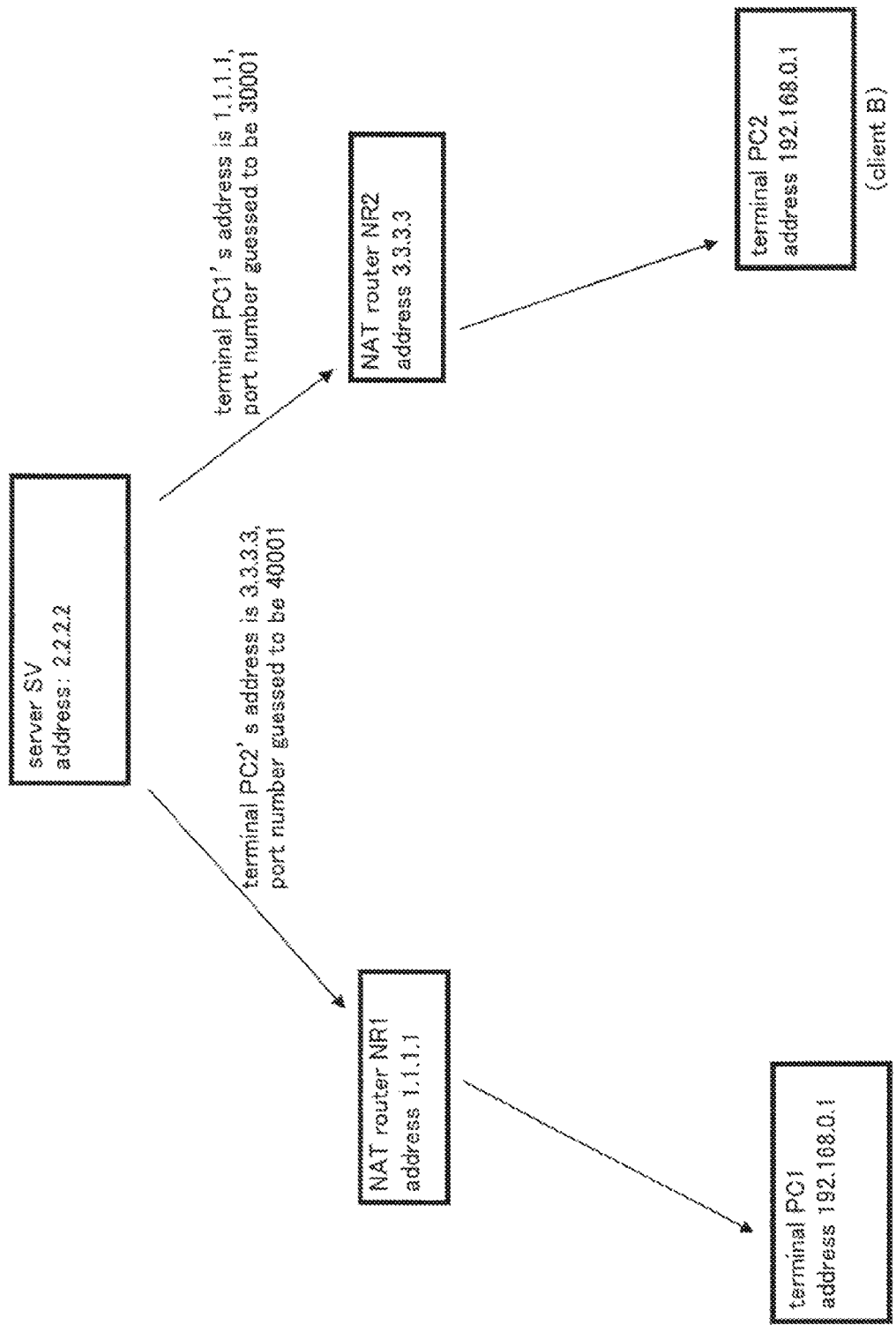
FIG. 4B indicates communication from the server to the terminals PC1 and PC2 (clients A and B) according to the first embodiment.
Figure 4C:
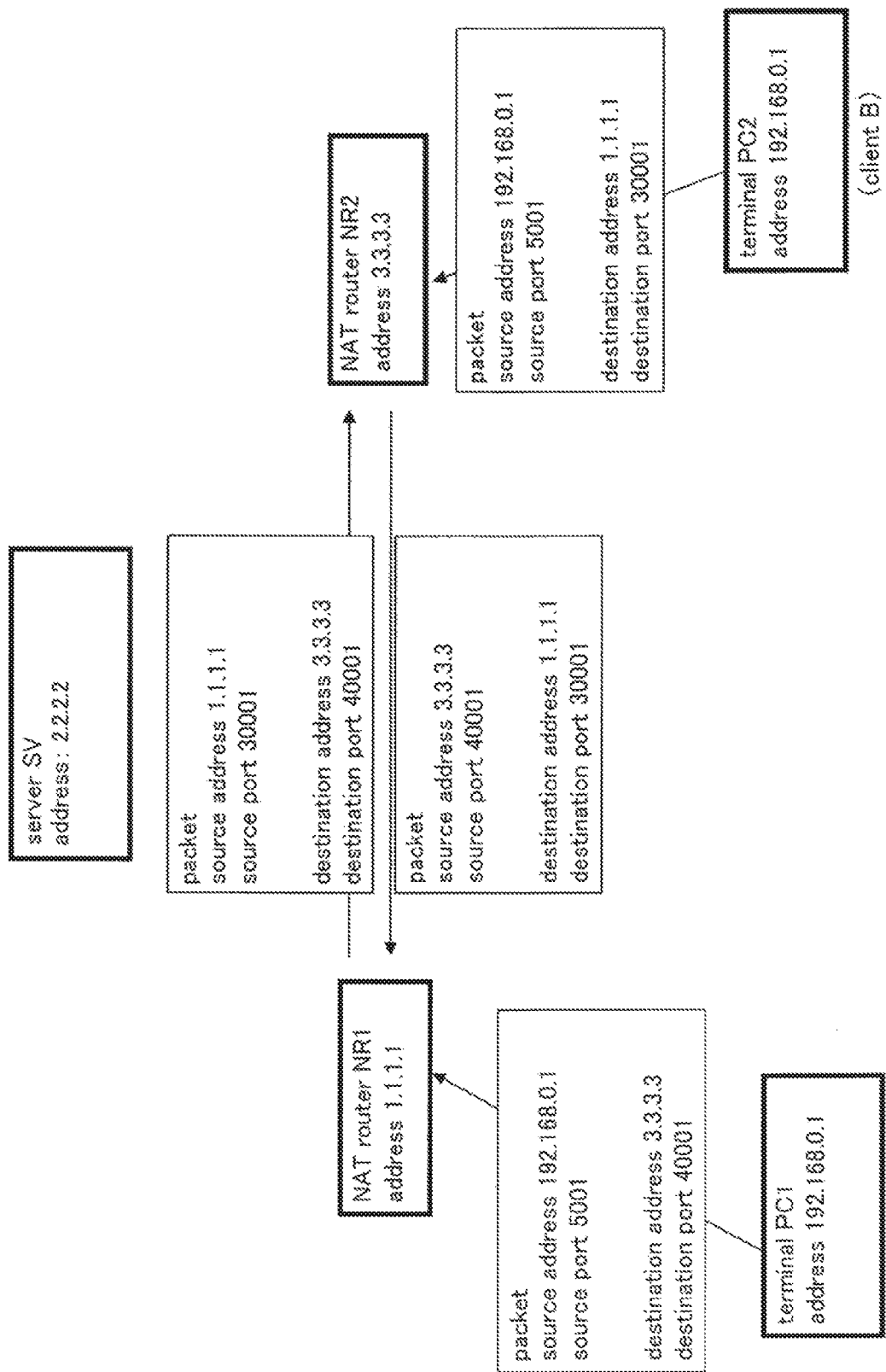
FIG. 4C indicates communication between the terminals PC1 and PC2 (clients A and B) according to the first embodiment.

The communication system according to the first embodiment is formed of the session terminals (hereafter, referred to as "client terminals", or simply referred to as "clients" or "terminals") TMa to TMd located behind NAT routers NRa to NRd, respectively, and the session management server (hereafter, simply referred to as "server") SV which is not located behind any NAT routers. Using source address, source port number, destination address and destination port number, the client terminals TMa to TMd can directly communicate with each other via the NAT routers NRa to NRd, respectively. As described with reference to FIG. 2, however, it is necessary to establish communication (connections) between the terminals TMa to TMd even in a case where the NAT router NR behind which one client terminal TM is located is the type of pattern 3 (address and port number-dependent mapping) (see FIG. 1C) which translates a source port number into different source port numbers even for packets having different destination port numbers. FIG. 4A to FIG. 4C indicate procedures and operating examples for establishing communication between two client terminals according to the first embodiment.

Hereafter, a case where a connection is to be established between the client terminal (A) TMa and the client terminal (B) TMb will be described as an example. In the following description, the client terminal (A) TMa serves as the terminal PC1 while the client terminal (B) TMb serves as the terminal PC2. Furthermore, the NAT router (A) NRa and the NAT router (B) NRb behind which the client terminals TMa and TMb (PC1 and PC2) are located serve as the NAT router NR1 and NAT router NR2, respectively.

Prior to direct communication between the terminals PC1 and PC2, as indicated in FIG. 4A, the terminal PC1 sends a packet (data) to "destination address: 2.2.2.2" and "destination port number: 5000", that is, to the server SV, using "source address: 192.168.0.1" and "source port number: 5000". The terminal PC2 also sends a packet to "destination address: 2.2.2.2" and "destination port number: 5000", that is, to the server SV, using "source address: 192.168.0.1" and "source port number: 5000". The server SV receives the packets sent from the terminals PC1 and PC2, recognizes "source address: 1.1.1.1" and "source port number: 30000" which are the results translated by the NAT router NR1 behind which the terminal PC1 is located, and recognizes "source address: 3.3.3.3" and "source port number: 40000" which are the results translated by the NAT router NR2 behind which the terminal PC2 is located.

Then, as indicated in FIG. 4B, the server SV defines the recognized "source address: 1.1.1.1" related to the terminal PC1 as the address of the terminal PC1, and guesses "port number: 30001" obtained by adding "+1" to the recognized "port number: 30000" related to the terminal PC1 to be the port number of the terminal PC1. Then, the server SV notifies the terminal PC2 that the address of the terminal PC1 is "1.1.1.1", with the port number of the terminal PC1 being guessed to be "30001". Furthermore, the server SV defines the recognized "source address: 3.3.3.3" related to terminal PC2 as the address of the terminal PC2, and guesses "port number: 40001" obtained by adding "+1" to the recognized "source port number: 40000" related to the terminal PC2 to be the port number of the terminal PC2. Then, the server SV notifies the terminal PC1 that the address of the terminal PC2 is "3.3.3.3", with the port number of the terminal PC1 being guessed to be "40001". The terminals PC1 and PC2 receive the notification as the destination address and the destination port number.

Then, as indicated in FIG. 4C, the terminal PC1 reserves "source port number: 5001" which is different from "source port number: 5000" used for the above-described transmission of the packet to the server SV. Using "source address: 192.168.0.1" and the reserved "source port number: 5001", the terminal PC1 sends a packet to "destination address: 3.3.3.3" and "destination port number: 40001" notified by the server SV, that is, to the terminal PC2. Furthermore, the terminal PC2 reserves "source port number: 5001" which is different from "source port number: 5000" used for the above-described transmission of the packet to the server SV. Using "source address: 192.168.0.1" and the reserved "source port number: 5001", the terminal PC2 sends a packet to "destination address: 1.1.1.1" and "destination port number: 30001" notified by the server SV, that is, to the terminal PC1. Although the source port number was changed by adding "+1" to the source port number used for the previous transmission in the above-described example, any source port number other than the source port number used for the previous transmission may be used.

In this case, the NAT routers NR1 and NR2 behind which the terminals PC1 and PC2 are located have the property that if a source port number different from the previous source port number is used, the NAT router changes the source port number that the NAT router has translated at the previous translation, irrespective of the patterns 1 to 3. The change in source port number is generally done in the sequential manner" (that is, "+1" is added to a previously translated result). Therefore, the port numbers of the terminals PC1 and PC2 agree with each other, so that the terminals PC1 and PC2 can communicate with each other.

Operating Example

Figure 5:
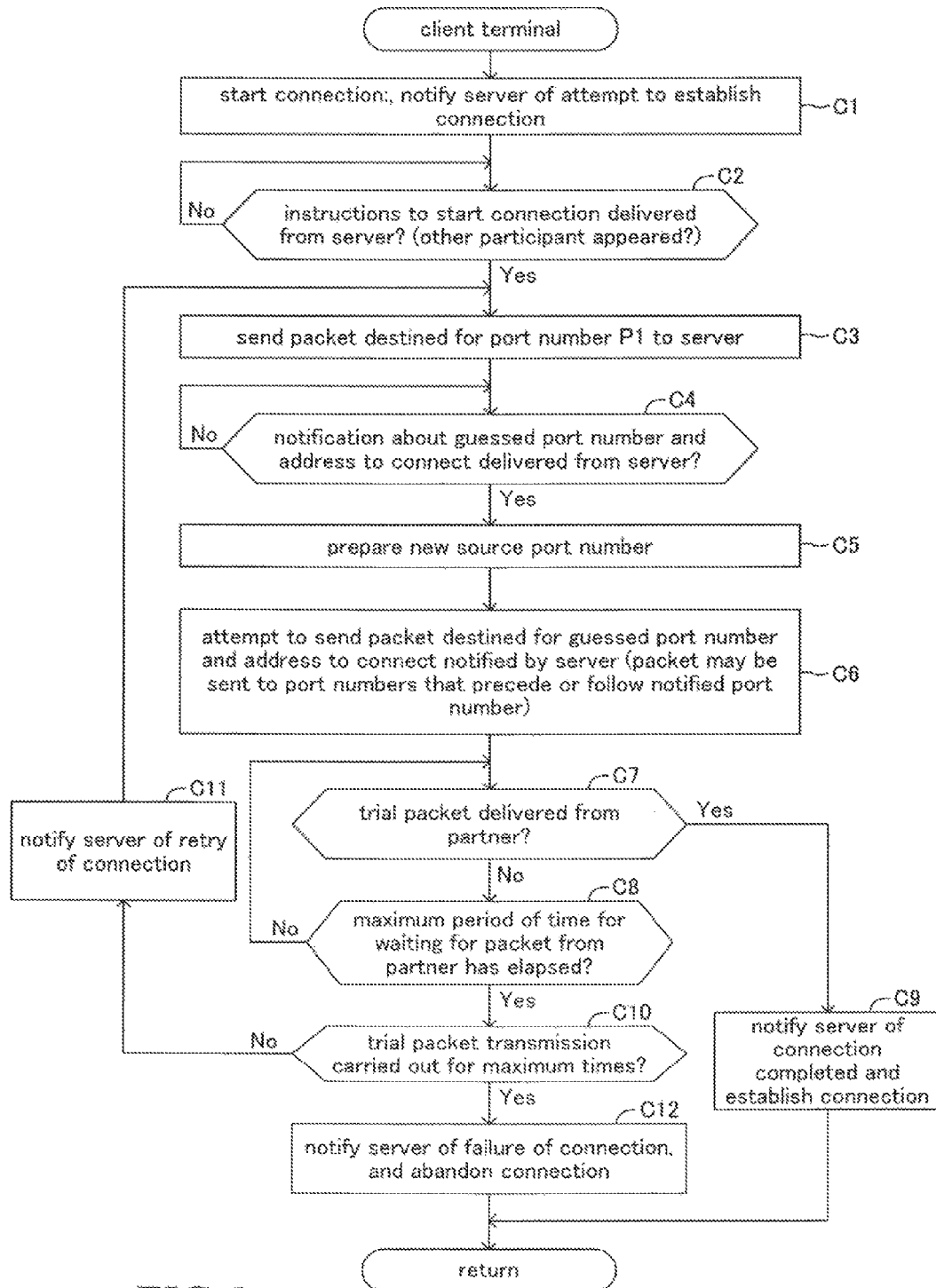
FIG. 5 indicates a flowchart indicating an example connecting operation of the client terminal according to the first embodiment.
Figure 6:
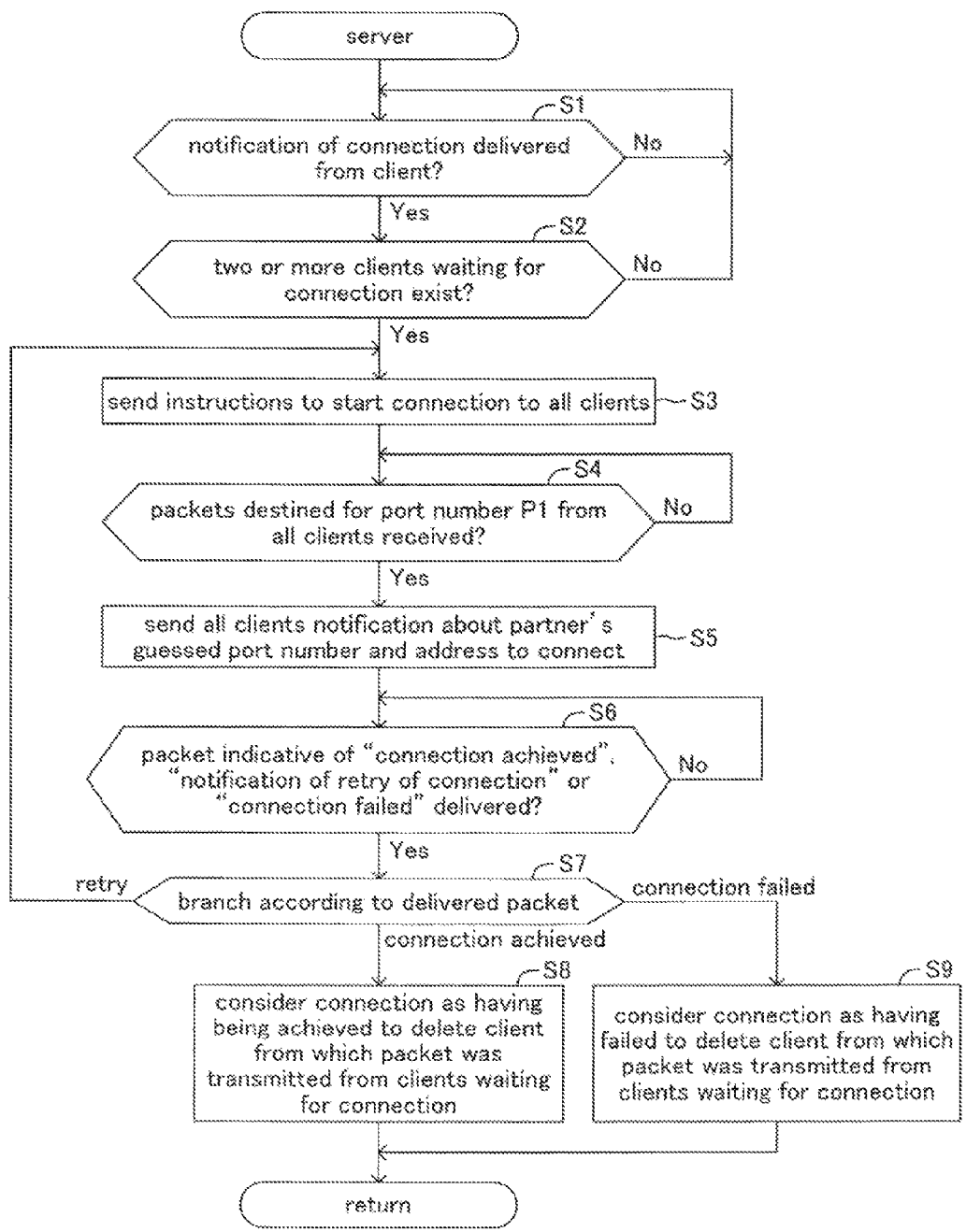
FIG. 6 indicates a flowchart indicating an example connection assisting operation of the server according to the first embodiment.

Next, a concrete operating example will be described. FIG. 5 indicates an example connecting operation of the client terminal TM according to the first embodiment. FIG. 6 indicates an example connection assisting operation of the server SV according to the first embodiment. In other words, FIG. 5 indicates a flowchart of a computer program according to the example connecting operation according to the first embodiment, the program being executed by a CPU (not shown) of the client terminal TM. FIG. 6 indicates a flowchart of a computer program according to the example connection assisting operation according to the first embodiment, the program being executed by a CPU (not shown) of the server SV.

These programs are stored in storage media (storage devices) formed of a flexible disk, hard disk, solid state drive, magneto-optical disk, CD, DVD, magnetic tape, or nonvolatile memory such as ROM provided in the client terminal TM and the server SV. In this case, these programs may be previously stored in the storage media, or may be externally retrieved to be stored in the storage media. Then, each CPU of the client terminal TM and the server SV reads out the program from the storage medium and executes the program. In this case, the programs stored in the storage media may be executed directly. Alternatively, the programs may be read out from the nonvolatile storage media to be written into volatile memories such as RAM to be executed.

If the client terminal TM receives instructions by user's manipulation to start connection, the client terminal TM (the CPU serving as a control portion) starts executing the program indicated in FIG. 5. At step C1, the client terminal TM notifies the server SV of an attempt to establish connection. Then, the client terminal TM judges at step C2 whether or not instructions to start connection have been delivered from the server SV, that is, whether any other participant has appeared. If instructions to start connection have not been delivered from the server SV, the client terminal TM gives "NO" at step C2, and performs step C2 repeatedly to wait for delivery of instructions to start connection. Although the above description describes notification of connection sent to the server SV from one client terminal TM, other client terminals TM attempting to communicate with each other also perform the above-described steps C1 and C2 in this state. Each of later-described operations done by the client terminal TM in the program shown in FIG. 5 is also performed by the client terminals TM attempting to communicate with each other.

On the other hand, the server SV starts executing the program indicated in FIG. 6. At step S1, more specifically, the server SV judges whether or not the notification of connection made at the above-described step C1 has been delivered from the client terminal TM. In a state where the notification has not been delivered, the server SV gives "NO" at step S1 to wait for the notification of connection from the client terminal TM. When the notification of connection has been delivered from one client terminal TM, the server SV gives "YES" at step S1 to proceed to step S2. At step S2, the server SV judges whether or not there are two or more client terminals TM waiting for connection (whether any other participant has appeared). If there are not two or more client terminals TM waiting for connection, the server SV gives "NO" at step S2 to return to step S1 to wait again for notification of connection from other client terminals TM. The server SV then repeats the steps S1 and S2. In this case, at the point in time when the notifications of connection from two client terminals TM have been delivered, the server SV gives "YES" at step S2. However, there can exist three or more client terminals TM. Therefore, it is preferable that the server SV takes a certain period of time to wait before giving "YES" at step S2 after the notification of connection from one client terminal TM. During the waiting time, the server SV keeps giving "NO" at step S2 to repeat steps S1 and S2.

If there exist two or more client terminals TM waiting for connection to give "YES" at step S2, the server SV sends instructions to start connection to all the client terminals TM waiting for connection at step S3. After step S3, the server SV judges at step S4 whether or not the server SV has received packets destined for port number P1 from all the client terminals TM which the server SV had instructed to start connection. In a state where the server SV has not received packets destined for port number P1 from all the client terminals TM, the server SV gives "NO" at step S4 to wait for reception of the packets.

On the other hand, if the instructions to start connection are sent from the server SV during standby at step C2, each client terminal TM waiting for instructions to start connection receives the instructions to start connection to give "YES" at step C2 to proceed to step C3. At step C3, each client terminal TM sends a packet destned for port number P1 to the server SV, using a certain source address and a certain source port number. After step C3, each client terminal TM judges at step C4 whether the notification about guessed port number and address to which the each client terminal TM is to connect has been delivered from the server SV. Each client terminal TM keeps giving "NO" at step C4 until the notification about guessed port number and address to connect is delivered to wait for the notification about port number and address to connect.

At step S4, at each time the packet is sent from the client terminal TM, the server SV waiting for reception of the packets receives the transmitted packet. When the server SV has received the packets destined for port number P1 from all the client terminals TM which the server SV had notified of connection, the server SV gives "YES" at step S4 to proceed to step S5. At step S5, the server SV sends each client terminal TM notification about partner's guessed port number and address to connect. More specifically, the server SV figures out a guessed port number by adding "+1" to the source port number of the packet received from each client terminal TM, and defines the source address of the received packet as an address to connect. Then, the server SV sends each client terminal TM the guessed port number and the address related to its partner client terminal TM with which the each client terminal TM is to communicate.

Then, at step S6, the server SV judges whether or not a packet indicative of "connection achieved", "retry of connection" or "connection failed" has been delivered from the client terminal TM. If not, the server SV gives "NO" at step S6 to wait for delivery of the packet. As for "connection achieved" on the judgement at step S6, it is judged whether a notification has been delivered from all of the client terminals TM to which the server SV had transmitted the instructions to start connection at step S5. As for "retry of connection" and "connection failed", however, it is judged whether the notification has been delivered from any one of the client terminals TM.

On the other hand, if the guessed port number and address to connect are delivered from the server SV, each client terminal TM waiting for the notification of port number and address to connect receives the guessed port number and address to connect, and gives "YES" at step C4 to proceed to step C5. At step C5, the client terminal TM prepares a new source port number which is different from the source port number used for the packet sent to the server SV at step C3. In this case, the new source port number is obtained by adding "+1" to the source port number used for the packet sent to the server SV. However, any other source number may be used, as long as the new source port number is different from the one used for the packet sent to the server SV.

At step C6, using the certain source address which is the same source address as the above-described step C3 and the newly prepared source port number, the client terminal TM attempts to establish connection between the partner client terminal TM by sending a trial packet (trial data) to the partner client terminal TM's guessed port number and address notified by the server SV.

The client terminal TM may attempt to establish connection between the partner client terminal TM not by using only the partner client terminal TM's guessed port number and address to connect notified by the server SV as described above but by using some pieces of port numbers that precede or follow the notified guessed port number and the notified address to connect. For example, the preceding or following port numbers are some pieces of port numbers obtained by adding "+1", "+2", "+3", . . . to the notified guessed port number, and some pieces of port numbers obtained by subtracting "+1", "+2", "+3", . . . from the notified guessed port number. This scheme may be employed because of the following reason. There are cases where if a certain port of the NAT router behind which the partner client terminal TM is located happens to be occupied, the NAT router NR changes the port number to a vacant port number that precedes or follows the guessed port number notified by the server SV regardless of the pattern (any one of the patterns 1 to 3) of the NAT router behind which the partner client terminal TM is located. This scheme is therefore employed because in such cases, the trial packet using the notified guessed port number would not be delivered to the partner client terminal TM.

After the above-described step C6, each of the client terminals TM judges at step C7 whether or not a trial packet has been delivered from its partner client terminal TM with which the each client terminal TM is to connect. In a state where the trial packet has not been delivered from the partner client terminal TM, the each client terminal TM gives "NO" at step C7 to proceed to step C8. At step C8, the each client terminal TM judges whether or not a predetermined maximum period of time for waiting for a packet from a partner client terminal TM has elapsed. If the maximum period of time has not elapsed yet, the client terminal TM gives "NO" at step C8 to return to step C7 to repeat the steps C7 and C8 until a trial packet is delivered from the partner client terminal TM or until the maximum period of time elapses.

During the loop processing of the steps C7 and C8, if the trial packet is delivered, the each client terminal TM gives "YES" at step C7 and proceeds to step C9. At step C9, the each client terminal TM notifies the server SV of connection achieved. As a result, the each client terminal TM which has received a trial packet from its partner client terminal TM establishes direct connection with its partner client terminal TM, and completes the connecting operation. Since the received trial packet includes a source address and a source port number related to the partner client terminal TM, the client terminal TM which has received the trial packet can recognize the partner client terminal TM's address and port number. Then, the client terminal TM moves to music session operation (ensemble) with its partner client terminal TM.

If the maximum period of time expires in a state where a trial packet has not been delivered from the partner client terminal TM, the each client terminal TM gives "YES" at step C8 to proceed to step C10. At step C10, the each client terminal TM judges whether or not the trial packet transmission by the step C6 has been carried out for the maximum times. If the trial packet transmission has not been carried out for the maximum times, the client terminal TM gives "NO" at step C10 to proceed to step C11. AT step C11, the each client terminal TM notifies the server SV of retry of connection, and then returns to step C3 to repeat the retry of connection formed of the above-described steps C3 to C8, C10 and C11. After the above-described step C11 where the client terminal TM notifies the server SV of retry, the process may be designed to return to step C2. If the trial packet transmission has been carried out for the maximum times, the each client terminal TM gives "YES" at step C10 to notify the server SV of failure of connection at step C12 to abandon the connection to terminate the connecting operation. In this case, the each client terminal TM is considered to have failed in the connection with its partner client terminal TM.

On the other hand, if the server SV which is repeating the above-described step S6 receives a packet indicative of "connection achieved", "retry of connection" or "connection failed" from the client terminal TM, the server SV gives "YES" at step S6 to proceed to step S7. At step S7, the server SV branches to a step corresponding to the packet indicative of "connection achieved", "retry of connection" or "connection failed" received from the client terminals TM.

More specifically, if the server SV receives a packet indicative of "connection achieved", the server SV proceeds to step S8 to consider the connection as having been achieved to delete the client terminal TM from which the packet was transmitted from client terminals TM waiting for connection. If the server SV receives a packet indicative of "retry of connection", the server SV returns to step S3 to repeat the above-described steps S3 to S7. If the server receives a packet indicative of "connection failed", the server SV proceeds to step S9 to consider the connection as having failed to delete the client terminal TM from which the packet has been transmitted from client terminals TM waiting for connection. After the step S8 or S9, the server SV returns to original stand-by state.

In the first embodiment, as described above, prior to direct communication between the client terminals A and B, packets are transmitted from the client terminals A and B to the server SV, while the server SV defines a port number obtained by adding only "+1" to a source port number used for the transmission of the packet as a guessed port number, and notifies each of the client terminals A and B of a partner's source address and guessed source port number. After the notification, by changing source port number to a source port number which is different from the source port number used for the transmission of the packet to the server SV, each of the client terminals A and B is able to communicate with each other by using the partner's address and guessed port number notified by the server SV. In the first embodiment, in other words, using the property that the NAT routers A and B translate to sequentially change source port number by a change in source port number, the client terminals A and B are able to communicate directly irrespective of the type of the NAT routers A and B behind which the client terminals A and B are located. According to the first embodiment, therefore, regardless of the type of the NAT routers A and B behind which the client terminals A and B are located, without the need for judging the type of the NAT routers A and B, the client terminals A and B can communicate directly with each other only by changing source port number used for transmission to the server SV.

Modified Examples

The first embodiment is designed such that in FIG. 4B and at step S5 of FIG. 6, the server SV obtains the guessed port number by adding "+1" to the client terminal TM's source port number sent by the client terminal TM and translated by the NAT router NR, and then sends the guessed port number to the partner client terminal TM. However, the first embodiment may be modified such that the server SV sends the source port number itself sent by the client terminal TM and translated by the NAT router NR to the partner client terminal TM. In this modification, the partner client terminal TM adds "+1" to the source port number sent by the server SV and uses the obtained port number as a destination port number. Alternatively, the first embodiment may be modified such that the server SV notifies the client terminal TM not of the guessed port number obtained by adding "+1" to the source port number or the source port number itself but of a guessed port number converted in accordance with a predetermined rule so that the client terminal TM can use the notified guessed port number converted in accordance with the rule as a destination port number.

In the first embodiment, furthermore, the server SV defines the port number obtained by adding "+1" to the source port number translated by the NAT router NR for transmission of the packet as the guessed port number, and notifies the partner client terminal TM of the defined guessed port number. However, the first embodiment may be modified such that in accordance with the behavior of the NAT router NR (the manner in which the NAT router NR translates a source number), the server SV determines a value other than "+1" to add or subtract ("+2", "+3" . . . , or "−2", "−3" . . . , for example) to obtain a guessed port number. The value "+1", "+2", "+3" . . . or "−1", "−2", "−3" . . . may be referred to as a predetermined value. A port number obtained by adding the determined value to the source port number sent by the client terminal TM or a port number obtained by subtracting the determined value from the source port number may be defined as a guessed port number so that the server SV can notify the partner client terminal TM of the guessed port number. This scheme may be employed because there can be cases where a NAT router is a type of router which does not translate source port number sequentially.

In the first embodiment, furthermore, in FIG. 4B and at step S5 of FIG. 6, the server SV concurrently notifies all the client terminals TM of addresses to connect and guessed port numbers to connect. However, the first embodiment may be modified such that the server SV notifies the client terminals TM of the addresses to connect independently of the guessed port numbers. In a case where each client terminal TM previously recognizes the address to connect, furthermore, the server SV may be designed to notify each client terminal TM only of a guessed port number to connect in FIG. 4B and at step S5 of FIG. 6.

c. Second Embodiment

Next, the second embodiment of the invention will be described.

[Overview of System Configuration]

Since the configuration of a network session system according to the second embodiment is completely the same as the configuration of the network session system of the first embodiment described with reference to FIG. 3, the description about the system configuration of the second embodiment will be omitted.

[Procedures for Retrieval of Translated Address and Port Number]

Similarly to the first embodiment, a communication system according to the second embodiment is also formed of client terminals TMa to TMd located behind NAT routers NRa to NRd, respectively, and a server SV which is not located behind any NAT routers. Using source address, source port number, destination address and destination port number, the client terminals TMa to TMd can directly communicate with each other via the NAT routers NRa to NRd, respectively. In this embodiment as well, as described with reference to the above-described FIG. 2, it is necessary to establish communication (connections) between the terminals TMa to TMd even in a case where the NAT router NR behind which one client terminal TM is located is the type of pattern 3 (address and port number-dependent mapping) (see FIG. 1C) which translates a source port number into different source port numbers even for packets having different destination port numbers. Hereafter, procedures and operating examples for establishing communication between two client terminals according to the second embodiment will be described.

In this embodiment as well, a case where a connection is to be established between the client terminal (A) TMa and the client terminal (B) TMb will be described. Furthermore, the client terminal (A) TMa serves as the terminal PC1 while the client terminal (B) TMb serves as the terminal PC2. Furthermore, the NAT router (A) NRa and the NAT router (B) NRb behind which the client terminals TMa and TMb (PC1 and PC2) are located serve as the NAT router NR1 and NAT router NR2, respectively.

In the second embodiment as well, prior to direct communication between the terminals PC1 and PC2, the terminals PC1 and PC2 transmit a packet (data) to the server SV. Since the transmission of the packet is similar to the case of the first embodiment, the description about the transmission of the packet will be omitted (see FIG. 4A). Then, the server SV guesses port numbers of the terminals PC1 and PC2, and notifies the terminals PC2 and PC1 of the guessed port numbers, respectively. The notification of the guessed port number is also similar to that of the first embodiment (see FIG. 4B).

In the description about the second embodiment, it is assumed that the source addresses and source port numbers which are the results translated by the NAT routers NR1 and NR2, and the guessed port numbers guessed by the server SV are similar to those of the first embodiment. However, since the source addresses, source port numbers and guessed port numbers are involved in later-described procedures and operating examples, the source addresses, source port numbers and guessed port numbers will be mentioned again. The result translated by the NAT router NR1 behind which the terminal PC1 is located is "source address: 1.1.1.1" and "source port number: 30000", while the result translated by the NAT router NR2 behind which the terminal PC2 is located is "source address: 3.3.3.3" and "source port number: 40000". The guessed port number related to the terminal PC1 by the server SV is "30001". The server SV notifies the terminal PC2 of "guessed port number (destination port number): 30001" and "destination address: 1.1.1.1". The guessed port number related to the terminal PC2 by the server SV is "40001". The server SV notifies the terminal PC1 of "guessed port number (destination port number): 40001" and "destination address: 3.3.3.3".

Figure 7A:
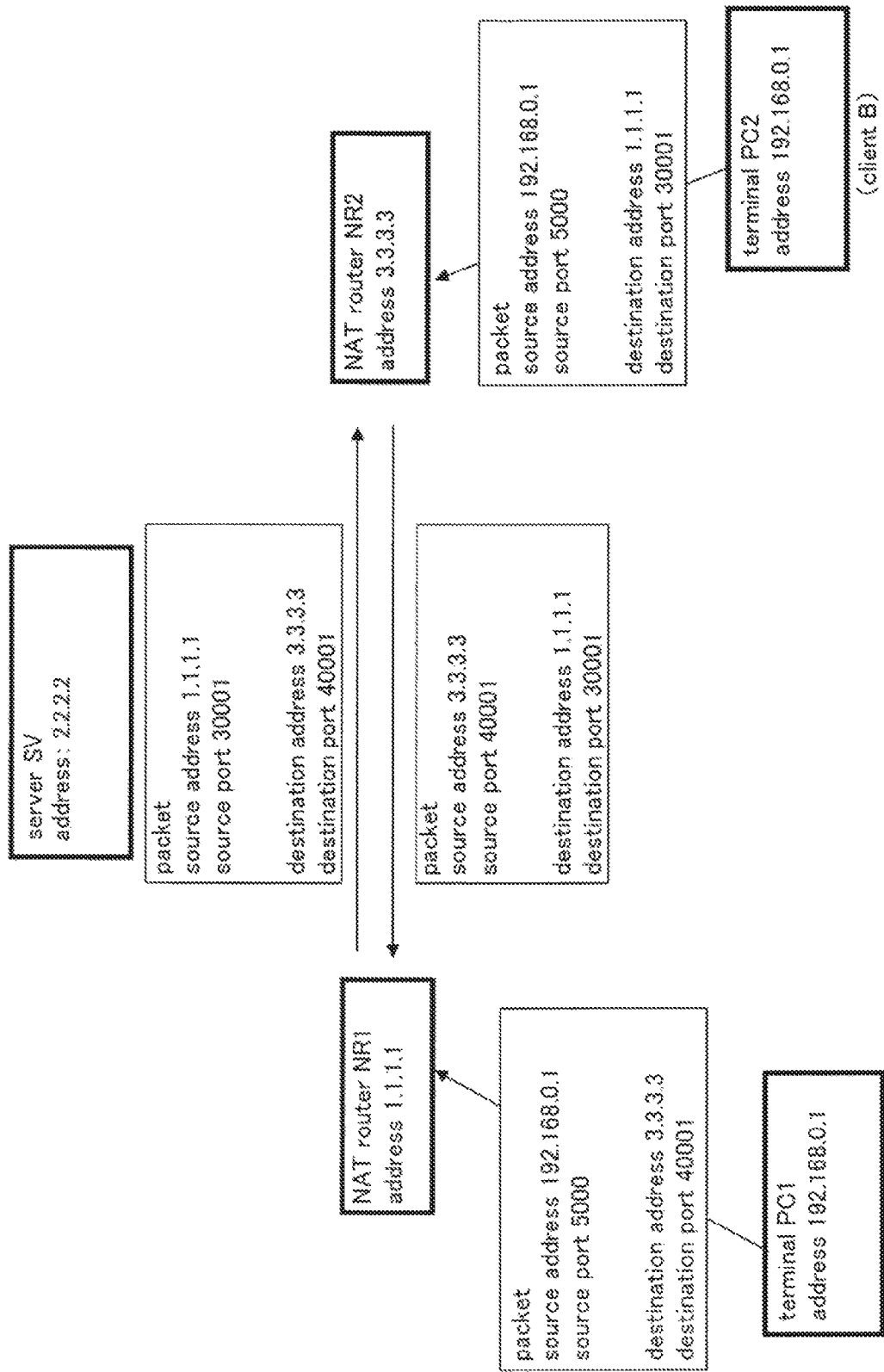
FIG. 7A indicates an example in which connection between the terminals PC1 and PC2 (clients A and B) is possible through the NAT routers of the pattern 2 or 3 according to the second embodiment of the invention.
Figure 7B:
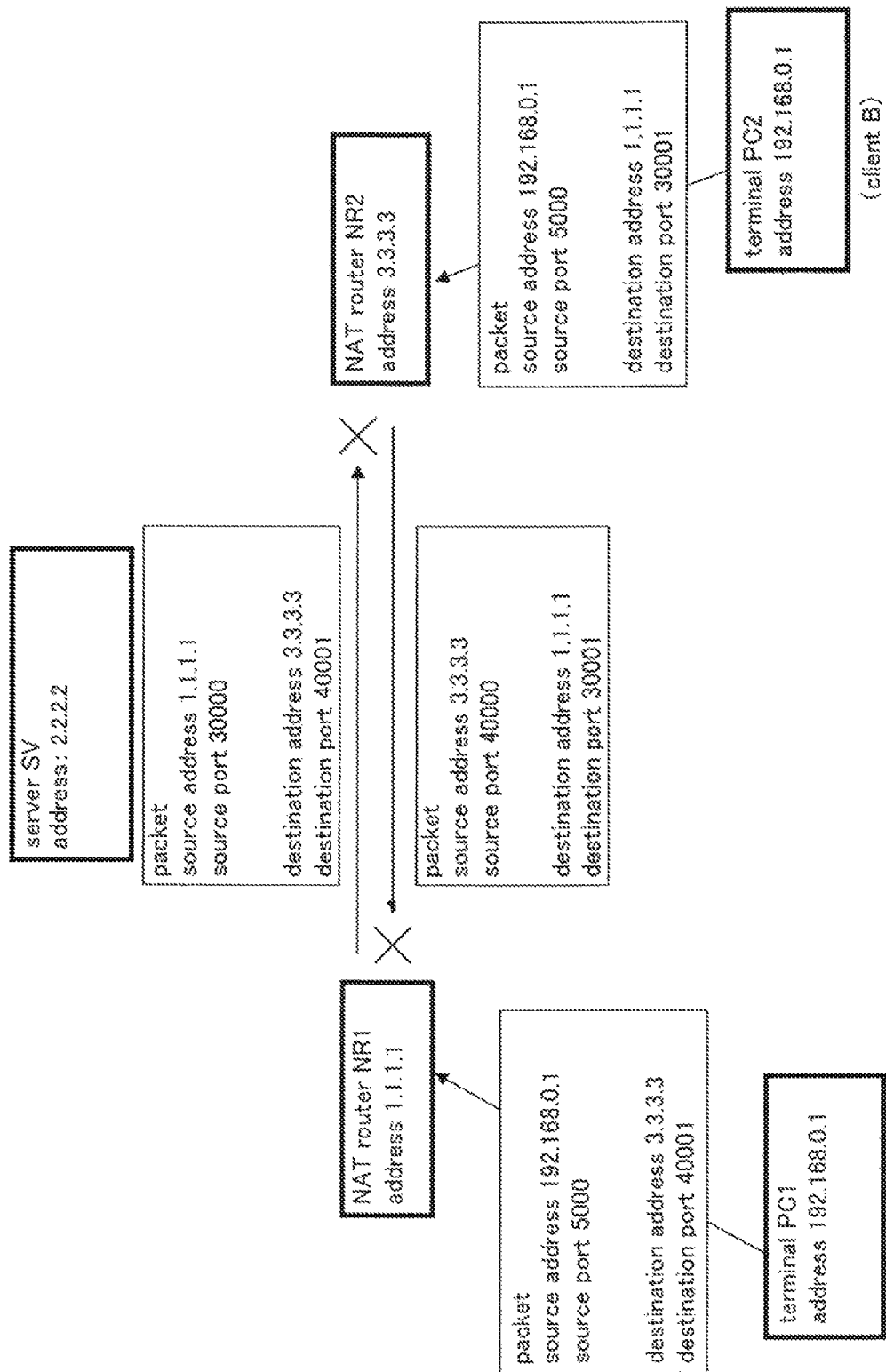
FIG. 7B indicates an example in which connection between the terminals PC1 and PC2 (clients A and B) is impossible through the NAT routers of the pattern 1 according to the second embodiment.
Figure 7C:
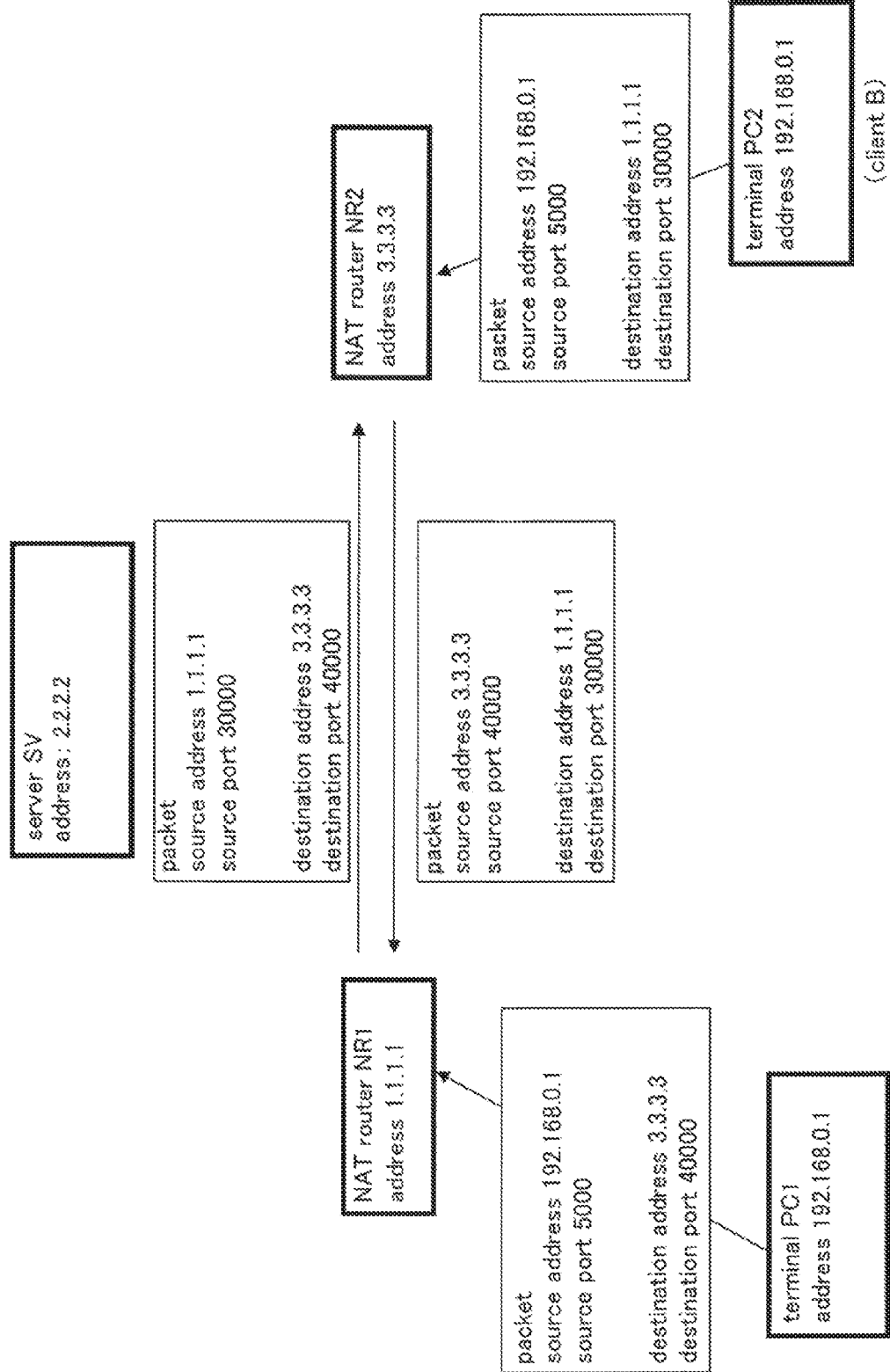
FIG. 7C indicates an example in which connection between the terminals PC1 and PC2 (clients A and B) is possible through the NAT routers of the pattern 1 according to the second embodiment.

Next, the operation for connecting between the terminals PC1 and PC2 will be described with reference to FIGS. 7A to 7C. FIG. 7A indicates an example in which connection between the terminals PC1 and PC2 (clients A and B) is possible, with the NAT routers NR1 and NR2 behind which the terminals PC1 and PC2 are located, respectively, being the type of pattern 2 defined as "Address-Dependent Mapping" or the type of pattern 3 defined as "Address and Port Number-Dependent Mapping". FIG. 7B indicates an example in which connection between the terminals PC1 and PC2 is impossible, with both the NAT routers NR1 and NR2 being the type of pattern 1 defined as "Endpoint-Independent Mapping". FIG. 7C indicates an example in which connection between the terminals PC1 and PC2 is possible, with both the NAT routers NR1 and NR2 being the type of pattern 1.

In this embodiment, each of the terminals PC1 and PC2 performs the following first connecting trial and second connecting trial in this order. In the first connecting trial, using the source address and source port number which are identical to the source address and source port used for the above-described packet transmission to the server SV, each of the terminals PC1 and PC2 transmits a packet to the destination address and destination port number that have been notified by the server SV and relate to its partner terminal PC2 or PC1. In the second connecting trial, using the source address and source port number which are identical to the source address and source port number used for the above-described packet transmission to the server SV, each of the terminals PC1 and PC2 transmits a packet to destination address that has been notified by the server SV and relates to its partner terminal PC2 or PC1, and destination port number obtained by subtracting "+1" from the destination port number that has been notified by the server SV and relates to its partner terminal PC2 or PC1.

Firstly, the first connecting trial will be concretely described. In this case, as indicated in FIG. 7A, using "source address: 192.168.0.1" and "source port number: 5000" which are identical to those used for the above-described packet transmission to the server SV, the terminal PC1 sends a packet to "destination address: 3.3.3.3" and "destination port number: 40001" notified by the server SV, that is, to the terminal PC2. Furthermore, using "source address: 192.168.0.1" and "source port number: 5000" which are identical to those used for the above-described packet transmission to the server SV, the terminal PC2 also sends a packet to "destination address: 1.1.1.1" and "destination port number: 30001" notified by the server SV, that is, to the terminal PC1.

First, a case where the NAT routers NR1 and NR2 behind which the terminals PC1 and PC2 are located are the routers of pattern 2 or pattern 3 will be described. In this case, since destination addresses are different from the destination addresses used for the above-described transmission of packets to the server SV, source port numbers are to be translated here such that the source port numbers translated last time ("source port numbers: 30000, 40000" translated for the transmission of the packets to the server SV) are changed sequentially (by adding "+1" to the previous translated results). In this first connecting trial, more specifically, the source port number related to the terminal PC1 is translated into "30001", while the source port number related to the terminal PC2 is translated into "40001". However, source addresses which are to be translated by the NAT routers NR1 and NR2 and relate to the terminals PC1 and PC2 will not be changed. Therefore, "destination port number: 40001" used for transmission of the packet from the terminal PC1 to the terminal PC2 agrees with "source port number: 40001" used for transmission of the packet from the terminal PC2 to the terminal PC1. Furthermore, "destination port number: 30001" used for transmission of the packet from the terminal PC2 to the terminal PC1 agrees with "source port number: 30001" used for transmission of the packet from the terminal PC1 to the terminal PC2. As a result, connection which enables communication between the terminals PC1 and PC2 via the NAT routers NR1 and NR2 is established.

Next, a case where both the NAT routers NR1 and NR2 behind which the terminals PC1 and PC2 are located are the routers of pattern 1 will be described. In this case, even if destination addresses are different from the destination addresses used for the above-described transmission of the packets to the server SV, or even if destination port numbers are different from the destination port numbers used for the transmission of the packets to the server SV, the source port numbers which are to be translated here are identical to the source port numbers translated last time ("source port numbers: 30000, 40000" translated for the transmission of the packets to the server SV) as indicated in FIG. 7B. In the first connecting trial, more specifically, the source port number related to the terminal PC1 is translated into "30000", while the source port number related to the terminal PC2 is translated into "40000". In this case as well, the source addresses which are to be translated by the NAT routers NR1 and NR2, and relate to the terminals PC1 and PC2 will not be changed. Therefore, "destination port number: 40001" used for transmission of the packet from the terminal PC1 to the terminal PC2 does not agree with "source port number: 40000" used for transmission of the packet from the terminal PC2 to the terminal PC1. Furthermore, "destination port number: 30001" used for transmission of the packet from the terminal PC2 to the terminal PC1 does not agree with "source port number: 30000" used for transmission of the packet from the terminal PC1 to the terminal PC2. As a result, connection which enables communication between the terminals PC1 and PC2 via the NAT routers NR1 and NR2 cannot be established.

Furthermore, a case where the NAT router NR1 behind which the terminal PC1 is located is the router of pattern 1, with the NAT router NR2 behind which the terminal PC2 is located being the router of pattern 2 or pattern 3 will be described. In this case, since the source port number related to the terminal PC2 is translated into "40001", "destination port number: 40001" used for transmission of the packet from the terminal PC1 to the terminal PC2 also agrees with "source port number: 40001" used for transmission of the packet from the terminal PC2 to the terminal PC1, as in the above-described case. However, since the source port number related to the terminal PC1 is translated into "30000", "destination port number: 30001" used for transmission of the packet from the terminal PC2 to the terminal PC1 does not agree with "source port number: 30000" used for transmission of the packet from the terminal PC1 to the terminal PC2, as in the above-described case. As a result, connection which enables communication between the terminals PC1 and PC2 via the NAT routers NR1 and NR2 cannot be established.

Furthermore, a case where the NAT router NR1 behind which the terminal PC1 is located is the router of pattern 2 or pattern 3, with the NAT router NR2 behind which the terminal PC2 is located being the router of pattern 1 will be described. In this case, since the source port number related to the terminal PC1 is translated into "30001", "destination port number: 30001" used for transmission of the packet from the terminal PC2 to the terminal PC1 also agrees with "source port number: 30001" used for transmission of the packet from the terminal PC1 to the terminal PC2, as in the above-described case. However, since the source port number related to the terminal PC2 is translated into "40000", "destination port number: 40001" used for transmission of the packet from the terminal PC1 to the terminal PC2 does not agree with "source port number: 40000" used for transmission of the packet from the terminal PC2 to the terminal PC1, as in the above-described case. As a result, connection which enables communication between the terminals PC1 and PC2 via the NAT routers NR1 and NR2 cannot be established.

Next, the second connecting trial for solving the state where connection that enables communication between the terminals PC1 and PC2 cannot be established will be concretely described. In this case, as indicated in FIG. 7C, using "source address: 192.168.0.1" and "source port number: 5000" which are identical to those used for transmission of the packet to the server SV, the terminal PC1 sends a packet to "destination address: 3.3.3.3" notified by the server SV and "destination port number: 40000" obtained by subtracting "+1" from "guessed port number (destination port number): 40001" notified by the server SV. That is, the terminal PC1 sends the packet to the terminal PC2. Furthermore, using "source address: 192.168.0.1" and "source port number: 5000" which are identical to those used for transmission of the packet to the server SV, the terminal PC2 also sends a packet to "destination address: 1.1.1.1" notified by the server SV and "destination port number: 30000" obtained by subtracting "+1" from "guessed port number (destination port number): 30001" notified by the server SV. That is, the terminal PC2 sends the packet to the terminal PC1.

First, the case where both the NAT routers NR1 and NR2 behind which the terminals PC1 and PC2 are located are the routers of pattern 1 will be described. In this case, as indicated in FIG. 7C, although respective destination port numbers used for transmission between the terminals PC1 and PC2 are different from the destination port numbers used for transmission of the packets in the first connecting trial, source port numbers which are to be translated here and relate to the terminals PC1 and PC2 are identical to the source port numbers translated in the first connecting trial. In this second connecting trial, more specifically, the source port number related to the terminal PC1 is translated into "30000", while the source port number related to the terminal PC2 is translated into "40000". In this case as well, however, source addresses which are to be translated by the NAT routers NR1 and NR2 and relate to the terminals PC1 and PC2 will not be changed. Therefore, "destination port number: 40000" used for transmission of a packet from the terminal PC1 to the terminal PC2 agrees with "source port number: 40000" used for transmission of a packet from the terminal PC2 to the terminal PC1. Furthermore, "destination port number: 30000" used for transmission of a packet from the terminal PC2 to the terminal PC1 agrees with "source port number: 30000" used for transmission of a packet from the terminal PC1 to the terminal PC2. As a result, the connection which enables communication between the terminals PC1 and PC2 via the NAT routers NR1 and NR2 can be established.

Furthermore, the case where the NAT router NR1 behind which the terminal PC1 is located is the router of pattern 1 with the router NR2 behind which the terminal PC2 is located being the router of pattern 2 or pattern 3 will be described. In this case as well, although respective destination port numbers used for transmission between the terminals PC1 and PC2 are different from the destination port numbers used for transmission of the packets in the first connecting trial, the source port number which is to be translated here to relate to the terminal PC1 is identical to the source port number translated in the first connecting trial. In this second connecting trial as well, more specifically, the source port number related to the terminal PC1 is translated into "30000". In this case as well, furthermore, source addresses translated by the NAT routers NR1 and NR2 to relate to the terminals PC1 and PC2 will not be changed. Therefore, "destination port number: 30000" used for transmission of the packet from the terminal PC2 to the terminal PC1 agrees with "source port number: 30000" used for transmission of the packet from the terminal PC1 to the terminal PC2. In other words, the destination port number sent by the terminal PC2 agrees with the source port number sent by the terminal PC1, unlike the first connecting trial that resulted in disagreement. By the second connecting trial, as a result, connection which enables communication between the terminals PC1 and PC2 via the NAT routers NR1 and NR2 but could not be established by the first connecting trial can be established.

Furthermore, the case where the NAT router NR1 behind which the terminal PC1 is located is the router of pattern 2 or pattern 3 with the router NR2 behind which the terminal PC2 is located being the router of pattern 1 will be described. In this case as well, although respective destination port numbers used for transmission between the terminals PC1 and PC2 are different from the destination port numbers used for transmission of the packets in the first connecting trial, the source port number which is to be translated here to relate to the terminal PC2 is identical to the source port number translated in the first connecting trial. In this second connecting trial as well, more specifically, the source port number related to the terminal PC2 is translated into "40000". In this case as well, furthermore, source addresses translated by the NAT routers NR1 and NR2 to relate to the terminals PC1 and PC2 will not be changed. Therefore, "destination port number: 40000" used for transmission of a packet from the terminal PC1 to the terminal PC2 agrees with "source port number: 40000" used for transmission of a packet from the terminal PC2 to the terminal PC1. In other words, the destination port number sent by the terminal PC1 agrees with the source port number sent by the terminal PC2, unlike the first connecting trial that resulted in disagreement. By the second connecting trial, as a result, connection which enables communication between the terminals PC1 and PC2 via the NAT routers NR1 and NR2 but could not be established by the first connecting trial can be established.

As described above, in the case where the NAT router NR1 behind which the terminal PC1 is located or the NAT router NR2 behind which the terminal PC2 is located is the router of pattern 1, in spite of the first connecting trial failing to establish connection that enables communication between the terminals PC1 and PC2 via the NAT routers NR1 and NR2, the connection that enables communication between the terminals PC1 and PC2 via the NAT routers NR1 and NR2 is established by the second connecting trial.

Operating Examples

Figure 8:
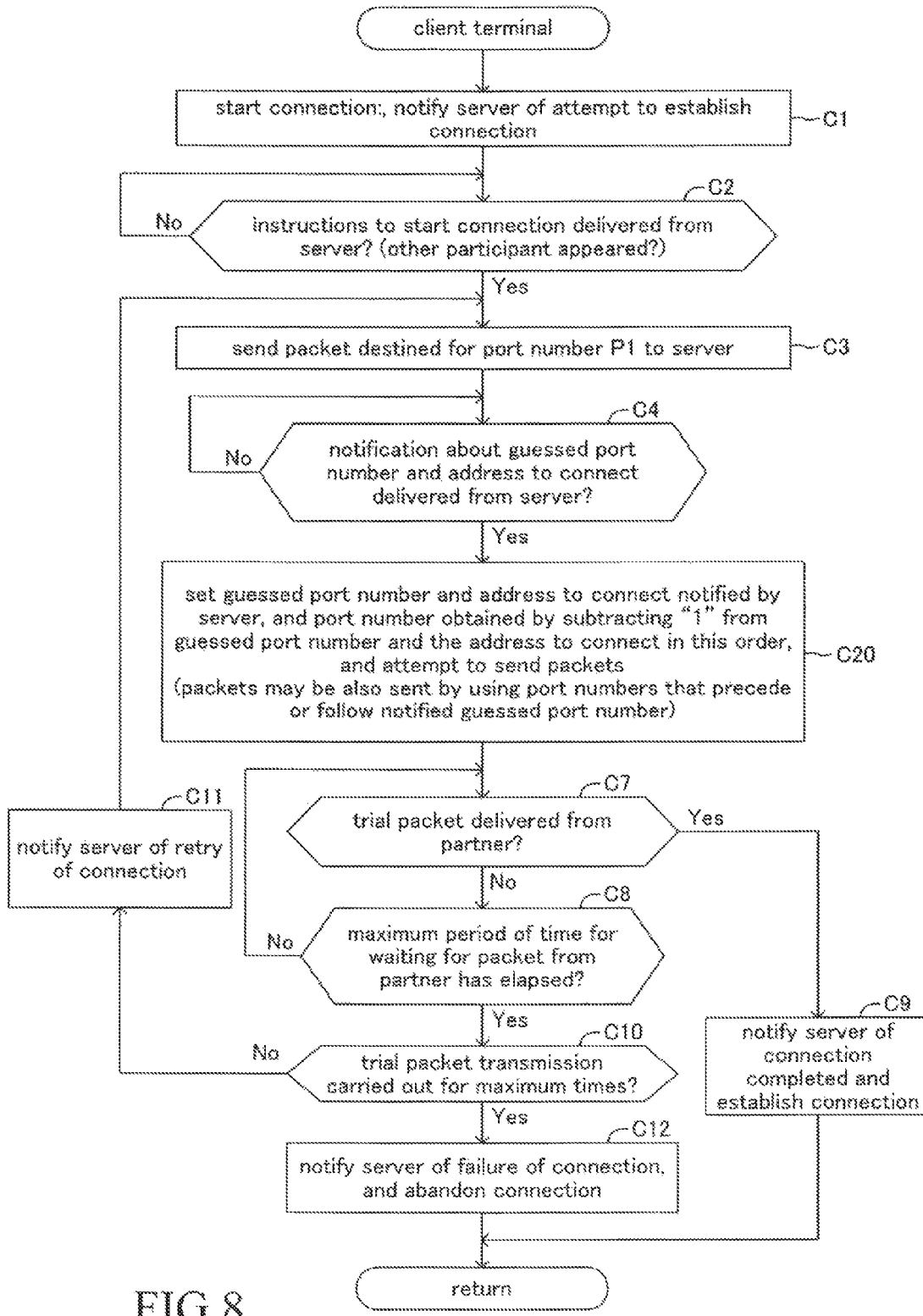
FIG. 8 indicates a flowchart indicating an example connecting operation of the client terminal according to the second embodiment.
Figure 9:
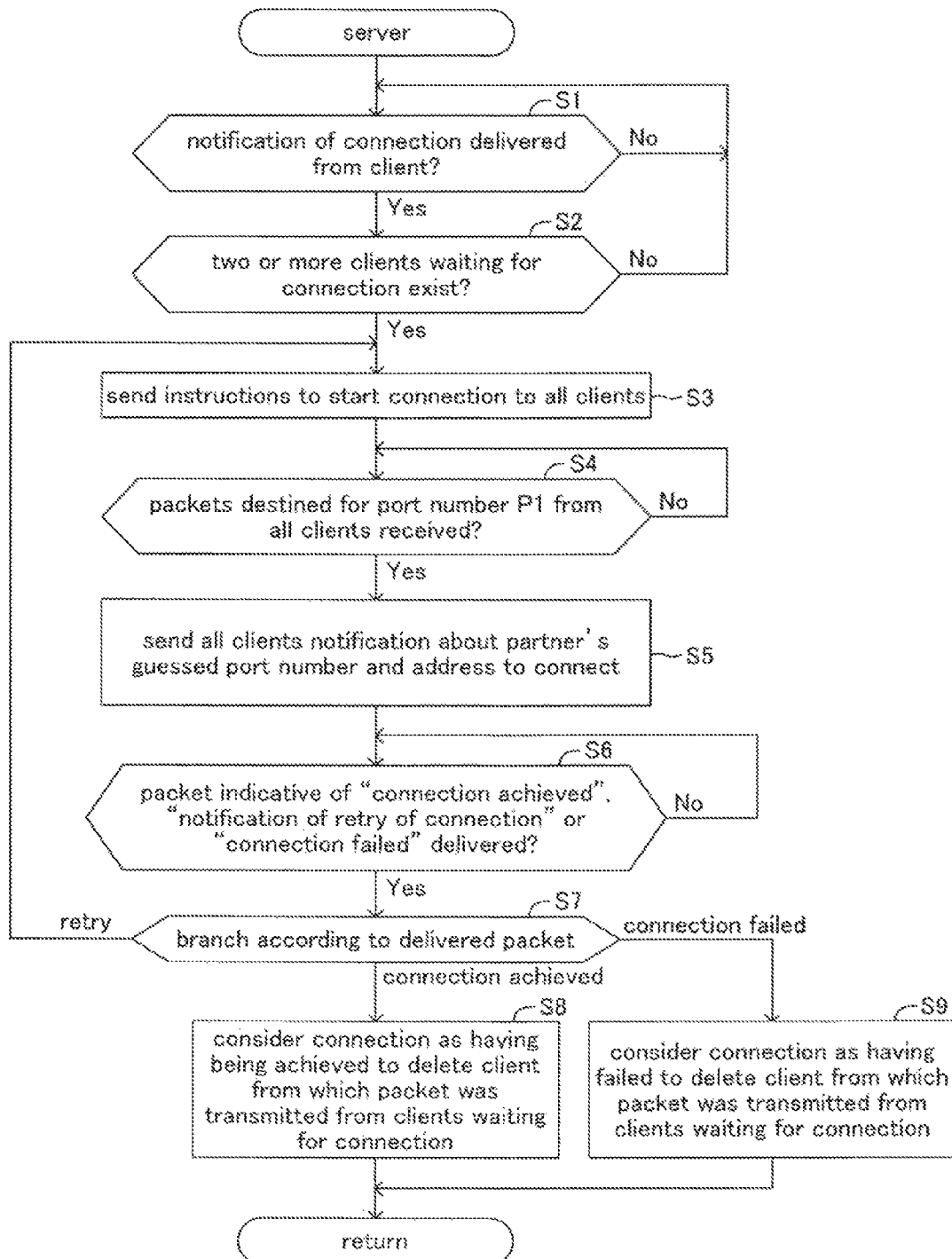
FIG. 9 indicates a flowchart indicating an example connection assisting operation of the server according to the second embodiment.

Next, concrete operating examples will be described. FIG. 8 indicates an example connecting operation of the client terminal TM according to the second embodiment. FIG. 9 indicates an example connection assisting operation of the server SV according to the second embodiment. In other words, FIG. 8 indicates a flowchart of a computer program according to the example connecting operation according to the second embodiment, the program being executed by a CPU (not shown) of the client terminal TM. FIG. 9 indicates a flowchart of a computer program according to the example connection assisting operation according to the second embodiment, the program being executed by a CPU (not shown) of the server SV.

In the second embodiment as well, similarly to the above-described first embodiment, these programs are stored in the storage media (storage devices) provided on the client terminals TM and the server SV. Each CPU of the client terminals TM and the CPU of the server SV read out the programs from the storage media and execute the programs. Since the programs according to the second embodiment are obtained by modifying part of the programs of the first embodiment, parts identical to the first embodiment are given the same numbers to omit detailed descriptions about the parts.

If the client terminal TM receives instructions by user's manipulation to start connection, the client terminal TM starts executing the program indicated in FIG. 8. At step C1, the client terminal TM notifies the server SV of an attempt to establish connection, and proceeds to step C2 to wait for delivery of the server SV's instructions to start connection. The server SV starts executing the program indicated in FIG. 9. At step S1, more specifically, the server SV judges whether or not the notification of connection has been delivered from the client terminal TM. At step S2, the server SV judges whether or not there are two or more client terminals TM waiting for connection. The server SV repeatedly performing steps S1 and S2 until these two conditions are satisfied. If these two conditions are satisfied, the server SV sends instructions to start connection to all the client terminals TM waiting for connection at step S3. At step S4, the server SV waits for reception of the packets destined for port number P1 from all the client terminals TM to which the server SV has sent instructions to start connection.

If the instructions to start connection are sent from the server SV, each client terminal TM waiting for instructions to start connection receives the instructions to start connection to proceed to step C3. At step C3, each client terminal TM sends a packet destined for port number P1 to the server SV, using a certain source address and a certain source port number. Then, at step C4, each client terminal TM waits for delivery of a notification about a guessed port number and an address to connect from the server SV.

At step S4, at each time the packet is sent from the client terminal TM, the server SV waiting for reception of the packets receives the transmitted packet. When the server SV has received the packets destined for port number P1 from all the client terminals TM which the server SV had notified of connection, the server SV gives "YES" at step S4 to proceed to step S5. At step S5, the server SV sends each client terminal TM notification about partner's guessed port number and address to connect. In this embodiment as well, more specifically, the server SV figures out a guessed port number by adding "+1" to the source port number of the packet received from each client terminal TM, and defines the source address of the received packet as an address to connect. Then, the server SV sends each client terminal TM the guessed port number and the address related to its partner client terminal TM with which the each client terminal TM is to communicate. Then, at step S6, the server SV waits for delivery of a packet indicative of "connection achieved", "retry of connection" or "connection failed" from the client terminal TM.

On the other hand, if the guessed port number and address to connect are delivered from the server SV, each client terminal TM waiting for the notification about guessed port number and address to connect receives the guessed port number and address to connect, and gives "YES" at step C4 to proceed to step C20. At step C20, the client terminal TM sets the partner client terminal TM's guessed port number and address notified by server SV as the first destination port number and destination address, and also sets a port number obtained by subtracting "+1" from the guessed port number and the address as the second destination port number and destination address. Using the certain source port number and the certain source address which are identical to those used in the above-described step C3, the client terminal TM attempts to connect to the partner client terminal TM by transmitting trial packets (trial data) destined for the above-defined first destination port number and destination address and for the above-defined second destination port number and destination address in this order. The transmission of the trial packet to the first destination port number and destination address corresponds to the above-described first connecting trial, while the transmission of the trial packet to the second destination port number and destination address corresponds to the above-described second connecting trial.

In the second embodiment as well, in addition to the transmission of the trial packet destined for the first destination port number and destination address, and the transmission of the trial packet destined for the second destination port number and destination address, the client terminal TM may attempt connection for three or more times, using some pieces of port numbers that precede or follow the first destination port number and the notified address to connect. The preceding or following port numbers are some pieces of port numbers obtained, for example, by adding "+1", "+2", "+3", . . . to the first destination port number (the guessed port number notified by the server SV), or some pieces of port numbers obtained by subtracting "+2", "+3", . . . from the first destination port number. In this case as well, the client terminal TM performs transmission of trial packets, using the certain source port number and source address which are the same as the above-described step C3. This scheme may be employed because of the following reason. There are cases where if a certain port of the NAT router behind which the partner client terminal TM is located happens to be occupied regardless of the pattern (any one of the patterns 1 to 3) of the NAT router behind which the partner client terminal TM is located, the NAT router NR changes the source port number to a vacant port number that precedes or follows the guessed port number notified by the server SV or a port number which is smaller by "+1" than the guessed port number. This scheme is therefore employed because in such cases, the trial packets using the first and second destination port numbers would not be delivered to the partner client terminal TM.

After the above-described step C20, each of the client terminals TM performs steps C7 to C12 which are the same steps as those performed in the first embodiment. By these steps C7 to C12, if a trial packet is delivered from the partner client terminal TM to which the client terminal TM is to connect, the client terminal TM notifies the server SV of "connection completed". If any trial packet is not delivered from the partner client terminal TM to which the client terminal TM is to connect, the client terminal TM notifies the server SV of "retry of connection", and retries connection. If a trial packet is not delivered even by the retry, the client terminal TM notifies the server SV of "connection failed".

If the server SV which is repeating the above-described step S6 receives a packet indicative of "connection completed", "retry of connection", or "connection failed" from the client terminal TM, the server SV gives "YES" at step S6 to proceed to perform steps S7 to S9 which are the same as the first embodiment.

In the second embodiment, as described above, the server SV receives a trial packet sent from each of the client terminals TM at step S4, and defines a port number greater by "+1" than the source port number used for transmission of the trial packet as a guessed port number and notifies the partner client terminal TM of the each client terminal TM of the guessed port number at step S5. In the first connecting trial at step C20, furthermore, using the source port number which is identical to the source port number used for transmission of the trial packet to the server SV, the each client terminal TM attempts to connect to its partner client terminal TM, with the guessed port number notified by the server SV being used as destination port number. In the first connecting trial, in a case where the NAT router NR behind which the each client terminal TM is located is the router of pattern 2 or pattern 3, since the address of the server SV is different from the partner client terminal TM's address, the source port number related to the each client terminal TM is increased by "+1" to the source port number used for transmission of the trial packet to the server SV at step C3. As a result, in the case where the NAT router NR behind which the each client terminal TM is located is the router of pattern 2 or pattern 3, the each client terminal TM can be connected to its partner client terminal TM so that the client terminals TM can communicate with each other.

However, in a case where the NAT router NR behind which the partner client terminal TM is located is the router of pattern 1, the partner's source port number is preserved to be the source port number used for transmission of the trial packet to the server SV at step C3 to fail to connect with the partner client terminal TM located behind the NAT router NR of pattern 1. In the second connecting trial performed at step C20, however, using the source port number which is identical to the source port number used for transmission of the trial packet to the server SV, the each client terminal TM attempts to connect to its partner client terminal TM with a destination port number which is smaller by "+1" than the guessed port number (the destination port number in the first connecting trial) notified by the server SV. In this case, the source port number will not be changed by the NAT router NR of pattern 1, so that the each client terminal TM can establish connection with its partner client terminal TM located behind the NAT router NR of pattern 1. According to the second embodiment, as a result, regardless of the pattern (any one of the patterns 1 to 3) of the NAT routers NR behind which the client terminals TM are located, the client terminals TM are able to directly communicate with each other without the need for processing for judging the pattern of the NAT routers NR.

As described in the second embodiment, as long as each client terminal TM has the capability (capability by the UDP hole punching technique, for example) of sequentially switching from a guessed port number notified by the server SV to a port number smaller by "+1" than the guessed port number to define as destination port numbers, direct communication is allowed only by changing the function of the server SV's side without the need for modifying processing functions of each client terminal TM's side, regardless of the pattern (any one of the patterns 1 to 3) of the NAT routers behind which the client terminals TM are located. According to the second embodiment, therefore, communication system can be improved easily, eliminating the need for modifying functions of the multiplicity of client terminals TM.

Modified Examples

The second embodiment is designed such that in FIG. 4B and at step S5 of FIG. 9, the server SV obtains the guessed port number by adding "+1" to the client terminal TM's source port number sent by the client terminal TM and translated by the NAT router NR, and notifies the partner client terminal TM of the obtained guessed port number. However, the second embodiment may be also modified such that the server SV sends the source port number itself sent by the client terminal TM and translated by the NAT router NR as a guessed port number to the partner client terminal TM. In this modification, the client terminal TM performs the first connecting trial by using a port number obtained by adding "+1" to the guessed port number (source port number itself) sent by the server SV as the first destination port number, and then performs the second connecting trial by using the guessed port number (source port number itself which is smaller by "+1" than the first destination port number) sent by the server as the second destination port number.

Furthermore, the second embodiment may be also modified such that the server SV notifies the client terminal TM not of the guessed port number obtained by adding "+1" to the source port number or the source port number itself but of a guessed port number converted in accordance with a predetermined rule. In this modification, the client terminal TM performs the first connecting trial by using the notified guessed port number converted in accordance with the rule as the first destination port number, and performs the second connecting trial by using a port number smaller by "+1" than the first destination port number as the second destination port number. The point is that the server SV receives a packet sent by each client terminal TM, guesses, in accordance with a source port number used for transmission of the packet, a guessed port number directly or indirectly indicating the source port number, and notifies the each client terminal TM of the guessed port number related to the partner client terminal TM with which the each client terminal TM is to communicate. Furthermore, using the guessed port number notified by the server SV, the each client terminal TM figures out a port number larger by "+1" than the source port number used for data transmission of packet from the partner client terminal TM to the server SV to perform the first connecting trial by using the port number as the first destination port number and to perform the second connecting trial by using a port number smaller by "+1" than the first destination port number as the second destination port number. In the first connecting trial and the second connecting trial by which the client terminal TM attempts to connect with the partner client terminal TM, the source port number which is identical to the source port number used for transmission of packet to the server SV is used.

In the second embodiment, furthermore, the server SV defines the port number obtained by adding "+1" to the source port number translated by the NAT router NR for transmission of the packet from the client terminal TM to the server SV as the guessed port number, and notifies the partner client terminal TM of the defined guessed port number. However, the second embodiment may be modified such that in accordance with the behavior of the NAT router NR (the manner in which the NAT router NR translates a source number), the server SV determines a value other than "+1" to add or subtract ("+2", "+3" . . . , or "−2", "−3" . . . , for example) to obtain a guessed port number. The value "+1", "+2", "+3" . . . or "−1", "−2", "−3" . . . may be referred to as a predetermined value. A port number obtained by adding the determined value to the source port number sent by the client terminal TM or a port number obtained by subtracting the determined value from the source port number may be defined as a guessed port number so that the server SV can notify the partner client terminal TM of the guessed port number. This scheme may be employed because there can be cases where a NAT router is a type of router which does not translate source port number sequentially.

In consideration of both the cases where the translation of source port numbers by the server SV is done in the sequential manner and where the translation of source port numbers is not done in the sequential manner, it is preferable that at step S5 of FIG. 9, the server SV obtains a port number which is greater or smaller by a value (equivalent to the above-described predetermined value) by which a source port number is changed by the NAT router than a partner client terminal's source port number used for transmission of data received at step S4 to define the obtained port number as a guessed port number, and notifies the client terminal TM of the guessed port number. In this case, furthermore, using the guessed port number that relates to the partner and has been notified by the server SV as the destination port number, the client terminal TM sends a packet to the partner client terminal TM in the first connecting trial. In the second connecting trial that follows the first connecting trial, by using the partner's guessed port number (identical to the destination port number in the first connecting trial) notified by the server SV and the value by which the source port number was changed, the client terminal TM derives a port number which is equal to the partner client terminal's source port number used for data transmission received at step S4, and sends the partner client terminal TM a packet with the derived port number as a destination port number.

As described in the above-described modified example, the server SV may send the partner client terminal TM the client terminal TM's source port number itself transmitted by the client terminal TM and translated by the NAT router NR as a guessed port number. In this modification as well, in consideration of the case where the translation of source port numbers is done in the sequential manner and the case where the translation of source port numbers is not done in the sequential manner, the first connecting trial and the second connecting trial by the client terminal TM are performed as follows. In the first connecting trial, using the guessed port number (that is, source port number which relates to the partner client terminal and has been used for transmission of a packet to the server) notified by the server SV and the value (equivalent to the above-described predetermined value) by which the NAT router changes a source port number, the client terminal TM figures out the partner client terminal TM's source port number which the NAT router has changed as a destination port number, and sends a packet to the partner client terminal TM by using the figured out destination port number. In the second connecting trial, defining the guessed port number (that is, the partner client terminal's source port number used for transmission of packet to the server) notified by the server SV as destination port number, the client terminal TM sends a packet to the partner client terminal TM.

In the second embodiment as well, furthermore, in FIG. 4B and at step S5 of FIG. 9, the server SV concurrently notifies all the client terminals TM of addresses to connect and guessed port numbers to connect. However, the second embodiment may be modified such that the server SV notifies the client terminals TM of the addresses to connect independently of the guessed port numbers. In a case where each client terminal TM previously recognizes the address to connect, furthermore, the server SV may be designed to notify each client terminal TM only of a guessed port number to connect in FIG. 4B and at step S5 of FIG. 9.

The invention claimed is:

1. A communication system comprising: a first terminal located behind a first NAT (Network Address Translation) router; a second terminal located behind a second NAT router; and a server which is not located behind any NAT routers, the first terminal and the second terminal communicating with each other through the first NAT router and the second NAT router; the first terminal including first transmitting unit for transmitting first data to the server through the first NAT router by using a first source port number; the second terminal including second transmitting unit for transmitting second data to the server through the second NAT router by using a second source port number; the server including: a data receiving unit for receiving the first data and the second data transmitted to the server by the first transmitting unit and the second transmitting unit, respectively; and a guessing unit for notifying the second terminal through the second NAT router of a first guessed port number obtained by adding a certain value to the first source port number used for transmission of the first data received by the data receiving unit, and notifying the first terminal through the first NAT router of a second guessed port number obtained by adding the certain value to the second source port number used for transmission of the second data received by the data receiving unit; the first terminal further including: a first receiving unit for receiving the second guessed port number notified by the guessing unit; and a first attempting unit for attempting to connect to the second terminal by transmitting third data to the second terminal through the first NAT router and the second NAT router by using the first source port number and a first destination port number identical to the second guessed port number, and attempting to connect to the second terminal by transmitting fifth data to the second terminal through the first NAT router and the second NAT router by using the first source port number and a third destination port number which is smaller by the certain value than the first destination port number; and the second terminal further including: a second receiving unit for receiving the first guessed port number notified by the guessing unit; and a second attempting unit for attempting to connect to the first terminal by transmitting fourth data to the first terminal through the second NAT router and the first NAT router by using the second source port number and a second destination port number identical to the first guessed port number, and attempting to connect to the first terminal by transmitting sixth data to the first terminal through the second NAT router and the first NAT router by using the second source port number and a fourth destination port number which is smaller by the certain value than the second destination port number.

2. The communication system according to claim 1, wherein the certain value is "+1".

3. A communication system comprising:
a first terminal located behind a first NAT router;
a second terminal located behind a second NAT router; and
a server which is not located behind any NAT routers,
the first terminal and the second terminal communicating with each other through the first NAT router and the second NAT router;
the first terminal including first transmitting unit for transmitting first data to the server through the first NAT router by using a first source port number;
the second terminal including second transmitting unit for transmitting second data to the server through the second NAT router by using a second source port number;
the server including:
a data receiving unit for receiving the first data and the second data transmitted to the server by the first transmitting unit and the second transmitting unit, respectively; and
a guessing unit for defining the first source port number used for transmission of the first data received by the data receiving unit as a first guessed port number and notifying the second terminal through the second NAT router of the first guessed port number, and defining the second source port number used for transmission of the second data received by the data receiving unit as a second guessed port number and notifying the first terminal through the first NAT router of the second guessed port number;
the first terminal further including:
a first receiving unit for receiving the second guessed port number notified by the guessing unit; and
a first attempting unit for attempting to connect to the second terminal by transmitting third data to the second terminal through the first NAT router and the second NAT router by using the first source port number and a first destination port number obtained by adding a certain value to the second guessed port number, and attempting to connect to the second terminal by transmitting fifth data to the second terminal through the first NAT router and the second NAT router by using the first source port number and a third destination port number which is smaller by the certain value than the first destination port number; and
the second terminal further including:
a second receiving unit for receiving the first guessed port number notified by the guessing unit; and
a second attempting unit for attempting to connect to the first terminal by transmitting fourth data to the first terminal through the second NAT router and the first NAT router by using the second source port number and a second destination port number obtained by adding the certain value to the first guessed port number, and attempting to connect to the first terminal by transmitting sixth data to the first terminal through the second NAT router and the first NAT router by using the second source port number and a fourth destination port number which is smaller by the certain value than the second destination port number.

4. The communication system according to claim 3, wherein the certain value is "+1".

5. A communicating method employed in a communication system including a first terminal located behind a first NAT router, a second terminal located behind a second NAT router, and a server which is not located behind any NAT routers to allow the first terminal and the second terminal to communicate with each other through the first NAT router and the second NAT router, the method comprising the steps of:

prior to communication between the first terminal and the second terminal, allowing the first terminal to transmit first data to the server through the first NAT router by using a first source port number; allowing the second terminal to transmit second data to the server through the second NAT router by using a second source port number;

allowing the server:

to receive the first and second data transmitted by the first terminal and the second terminal, respectively; and to notify the second terminal through the second NAT router of a first guessed port number obtained by adding a certain value to the first source port number used for transmission of the received first data, and to notify the first terminal through the first NAT router of a second guessed port number obtained by adding the certain value to the second source port number used for transmission of the received second data;

further allowing the first terminal:

to receive the second guessed port number notified by the server; and to attempt to connect to the second terminal by transmitting third data to the second terminal through the first NAT router and the second NAT router by using the first source port number and a first destination port number identical to the second guessed port number, and to attempt to connect to the second terminal by transmitting fifth data to the second terminal through the first NAT router and the second NAT router by using the first source port number and a third destination port number which is smaller by the certain value than the first destination port number; and further allowing the second terminal:

to receive the first guessed port number notified by the server; and to attempt to connect to the first terminal by transmitting fourth data to the first terminal through the second NAT router and the first NAT router by using the second source port number and a second destination port number identical to the first guessed port number, and to attempt to connect to the first terminal by transmitting sixth data to the first terminal through the second NAT router and the first NAT router by using the second source port number and a fourth destination port number which is smaller by the certain value than the second destination port number.

6. The communicating method according to claim 5, wherein the certain value is "+1".

7. A communicating method employed in a communication system including a first terminal located behind a first NAT router, a second terminal located behind a second NAT router, and a server which is not located behind any NAT routers to allow the first terminal and the second terminal to communicate with each other through the first NAT router and the second NAT router, the method comprising the steps of:

prior to communication between the first terminal and the second terminal, allowing the first terminal to transmit first data to the server through the first NAT router by using a first source port number;

allowing the second terminal to transmit second data to the server through the second NAT router by using a second source port number;

allowing the server:

to receive the first and second data transmitted by the first terminal and the second terminal, respectively; and to define the first source port number used for transmission of the received first data as a first guessed port number and notify the second terminal through the second NAT router of the first guessed port number, and to define the second source port number used for transmission of the received second data as a second guessed port number and notify the first terminal through the first NAT router of the second guessed port number;

further allowing the first terminal:

to receive the second guessed port number notified by the server; and to attempt to connect to the second terminal by transmitting third data to the second terminal through the first NAT router and the second NAT router by using the first source port number and a first destination port number obtained by adding a certain value to the second guessed port number, and to attempt to connect to the second terminal by transmitting fifth data to the second terminal through the first NAT router and the second NAT router by using the first source port number and a third destination port number which is smaller by the certain value than the first destination port number; and further allowing the second terminal:

to receive the first guessed port number notified by the server; and to attempt to connect to the first terminal by transmitting fourth data to the first terminal through the second NAT router and the first NAT router by using the second source port number and a second destination port number obtained by adding the certain value to the first guessed port number, and to attempt to connect to the first terminal by transmitting sixth data to the first terminal through the second NAT router and the first NAT router by using the second source port number and a fourth destination port number which is smaller by the certain value than the second destination port number.

8. The communicating method according to claim 7, wherein the certain value is "+1".

* * * * *